(12) United States Patent
Bang et al.

(10) Patent No.: US 10,827,349 B2
(45) Date of Patent: Nov. 3, 2020

(54) SEALANT: SECURITY FOR END-USERS OF ANDROID VIA LIGHT-WEIGHT ANALYSIS TECHNIQUES

(71) Applicant: UNIVERSITY OF SOUTHERN CALIFORNIA, Los Angeles, CA (US)

(72) Inventors: Jae Young Bang, Los Angeles, CA (US); Youn Kyu Lee, Los Angeles, CA (US); Nenad Medvidovic, Los Angeles, CA (US); Daye Nam, Los Angeles, CA (US); Gholamreza Safi, Los Angeles, CA (US); Arman Shahbazian, Los Angeles, CA (US); Peera Yoodee, Los Angeles, CA (US); Yixue Zhao, Los Angeles, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 0 days.

(21) Appl. No.: 16/410,347

(22) Filed: May 13, 2019

(65) Prior Publication Data

US 2019/0349756 A1   Nov. 14, 2019

Related U.S. Application Data

(60) Provisional application No. 62/670,550, filed on May 11, 2018.

(51) Int. Cl.
*H04W 12/00* (2009.01)
*G06F 21/57* (2013.01)

(52) U.S. Cl.
CPC ...... *H04W 12/0023* (2019.01); *G06F 21/577* (2013.01); *G06F 2221/033* (2013.01)

(58) Field of Classification Search
CPC ............ H04W 12/0023; H04W 12/06; H04W 12/00503; H04W 12/00512; H04W 12/08; H04W 12/00407; H04W 12/00505; H04W 12/00514; G06F 9/451; G06F 21/55

See application file for complete search history.

(56) References Cited

U.S. PATENT DOCUMENTS

| | | | |
|---|---|---|---|
| 2011/0238579 A1* | 9/2011 | Coppinger | G06Q 20/20 705/67 |
| 2016/0020906 A1* | 1/2016 | Nolte | H04L 63/083 705/71 |
| 2018/0060569 A1* | 3/2018 | Kim | G06F 21/52 |

* cited by examiner

*Primary Examiner* — Diane D Mizrahi
(74) *Attorney, Agent, or Firm* — Brooks Kushman P.C.

(57) ABSTRACT

A system for providing increased security in a mobile operating system includes at least one mobile device and a remote computing device that is remote from the mobile device. The remote computing device receives a list of two or more applications that are currently installed or intended to be installed on the mobile device's operating system. The remote computing device identifies vulnerable inter-component communication (ICC) paths by analyzing files associated with each of the two or more applications. A list of the vulnerable ICC paths is stored in memory of the mobile device. The mobile processor compares the list of the vulnerable ICC paths to intents sent by the components of the two or more applications and identifies a potential unsecure intent that matches one of the list of the vulnerable ICC paths. Unsecured intents can then be blocked by the user.

17 Claims, 9 Drawing Sheets

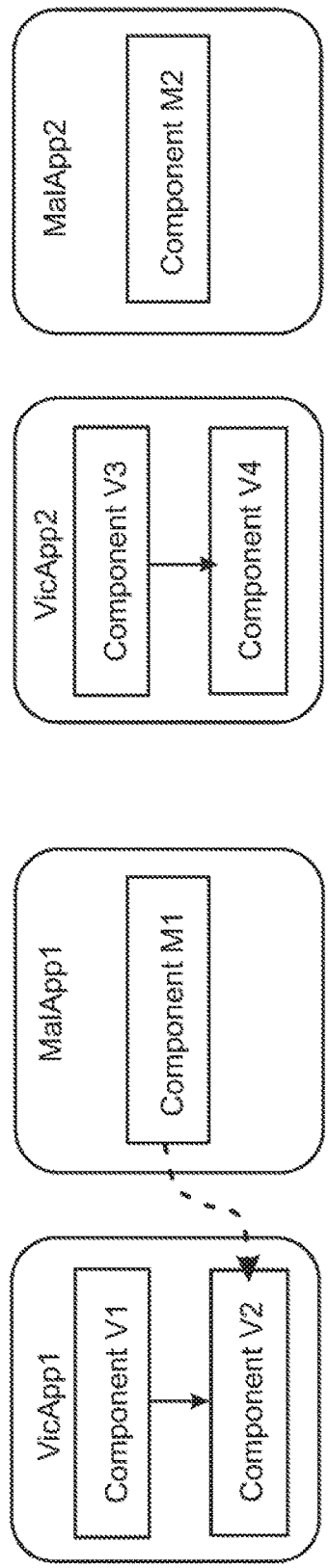
Fig. 5A
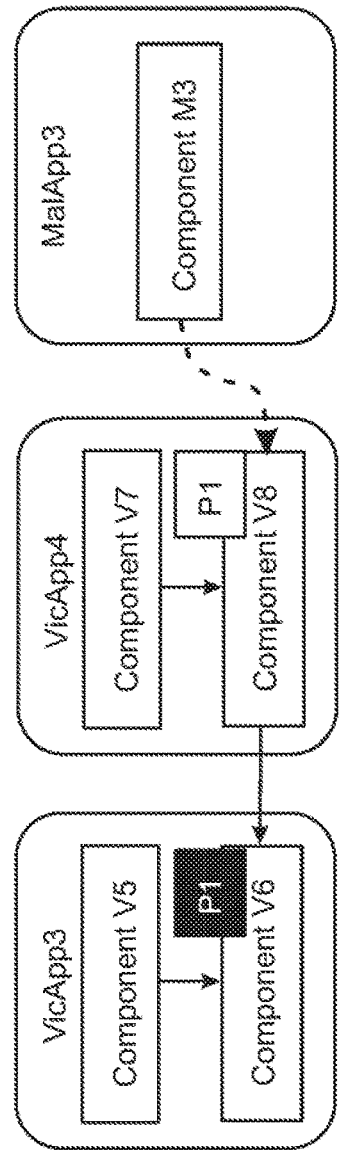
Fig. 5B
Fig. 5C

SEALANT: SECURITY FOR END-USERS OF ANDROID VIA LIGHT-WEIGHT ANALYSIS TECHNIQUES

CROSS-REFERENCE TO RELATED APPLICATIONS

This application claims the benefit of U.S. provisional application Ser. No. 62/670,550 filed May 11, 2018, the disclosure of which is hereby incorporated in its entirety by reference herein.

STATEMENT AS TO FEDERALLY SPONSORED RESEARCH

This invention was made with government support under contract Number 1618231 awarded by the National Science Foundation (NSF). The government has certain rights in this invention.

TECHNICAL FIELD

In at least one aspect, the present invention is related to methods and systems for providing increased security in a mobile operating system on a mobile device, such as a smart phone.

BACKGROUND

In Android's communication model [1] components in a single app or across multiple apps communicate by exchanging messages called intents. Inter-component communication (ICC) via intent exchange can expose a vulnerable surface to several security attacks, including intent spoofing [2], unauthorized intent receipt [2], and privilege escalation [3]. In these attacks, a malicious app sends and receives intents in a way that appears as if those are ordinary message exchanges. A large volume of research has focused on ICC vulnerabilities in Android [2], [4]-[14]. However, existing detection techniques target only certain types of inter-app attacks [4]-[6], [15] and/or do not support compositional analysis of multiple apps [2], [12], [14]. The state-of-the-art techniques [4], [5], [15] employ data-flow analyses that rely on lists of frequently used Android API methods [16], but tend to overlook ICC vulnerabilities caused by custom methods. Moreover, these analyses [4]-[6] have been shown to experience scalability problems when applied on large numbers of apps [16]. Meanwhile, the runtime protection techniques suffer from acknowledged frequent "false alarms" [11], [15] because of the coarse granularity at which they capture ICC information. Additionally, these techniques assume a degree of expertise in Android security [8], [9], [11], [13]. While certain techniques [15], [16] combine vulnerability detection with runtime protection to aid ordinary end-users, they also suffer from potentially large numbers of false alarms.

Accordingly, there is a need for improved methods and systems that provide security in mobile operating systems on mobile devices.

SUMMARY

In at least one aspect, a technique that aims to enable ordinary end-users to protect against inter-app attacks is provided. This technique is referred to as "SEALANT" (Security for End-users of Android via Light-weight ANalysis Techniques), SEALANT identifies vulnerable ICC paths between a given set of apps, inspects each intent sent via those paths at runtime to detect potential attacks, and enables end-users to block the intent on-the-fly. SEALANT is distinguished from the prior art because (1) it simultaneously prevents multiple types of Android inter-app attacks—with the current implementation focusing on intent spoofing, unauthorized intent receipt, and privilege escalation, (2) it extends the detection coverage via a novel combination of static data-flow analysis and compositional ICC pattern matching, (3) it causes fewer false alarms than existing techniques through a finer-grained characterization of ICCs, (4) it supports compositional analysis scaling to a number of apps, and (5) it integrates static detection with runtime monitoring and control of vulnerable ICC paths.

In another aspect, a system for providing increased security in a mobile operating system on a mobile device is provided. The system includes at least one mobile device and optionally, a remote computing device that is remote from the mobile device. The mobile device includes a mobile processor, an input component, and an output component. The mobile device executing a mobile operating system. The mobile device or the optional remote computing device receives and/or identifies two or more applications that are currently installed or intended to be installed on the mobile operating system. The mobile device or the optional remote computing device identifies vulnerable inter-component communication (ICC) paths between components of the two or more applications installed on the mobile operating system by analyzing files associated with each of the two or more applications. A list of the vulnerable ICC paths is stored in memory of the mobile device. The mobile processor compares the list of the vulnerable ICC paths to intents sent by the components of the two or more applications and identifies a potential unsecure intent that matches one of the list of the vulnerable ICC paths. The output component outputs output data requesting confirmation that the potential unsecure intent is authorized. The input component receives user input confirming or denying authorization of the potential unsecure intent such that the mobile processor blocks the potential unsecure intent when the user input denies the authorization of the potential unsecure intent.

In still another aspect, a system for providing increased security in a mobile operating system on a mobile device is provided. The system includes one or more computing devices operable to execute steps of: a) providing an interactive user interface; b) extracting vulnerable ICC paths from target apps as extracted information; c) managing the extracted information; d) transforming the extracted information into a visually representable format; and e) displaying at least a portion of the extracted information from the visually representable format.

In still another aspect, a method for providing increased security in a mobile operating system on a mobile device is provided. The method includes a steps of receiving and/or identifies, by the mobile device or the optional remote computing device that is remote from the mobile device, two or more applications that are currently installed or intended to be installed on the mobile operating system. Vulnerable inter-component communication (ICC) paths between components of the two or more applications installed on the mobile operating system are identified by the mobile device or the optional remote computing device by analyzing files associated with each of the two or more applications. A list of the vulnerable ICC paths are stored in memory of the mobile device. The list of the vulnerable ICC paths are compared to intents sent by the components of the two or more applications by a mobile processor of the mobile device. A potential unsecure intent that matches one of the list of the vulnerable ICC paths is identified by the mobile processor. Output data requesting confirmation that the potential unsecure intent is authorized is outputted by an output component of the mobile device. User input confirming or denying authorization of the potential unsecure intent is received by an input component of the mobile device. The mobile processor blocks the potential unsecure intent when the user input denies the authorization of the potential unsecure intent.

In still another aspect, a method for providing increased security in a mobile operating system on a mobile device is provided. The method includes a step of identifying, by the mobile device or the optional remote processor, vulnerable inter-component communication (ICC) paths between components of two or more applications installed on the mobile operating system by analyzing files associated with each of the two or more applications. A list of the vulnerable ICC paths is stored in memory of the mobile device. A potential unsecure intent between components of the two or more applications is identified by the mobile processor that matches one of the list of the vulnerable ICC paths. Finally, the mobile processor blocks the potential unsecure intent.

BRIEF DESCRIPTION OF THE DRAWINGS

FIGS. 5A, 5B, and 5C: Inter-App Attacks. (A) intent spoofing, (B) unauthorized intent receipt, (C) privilege escalation.

DETAILED DESCRIPTION

Figure 1A:
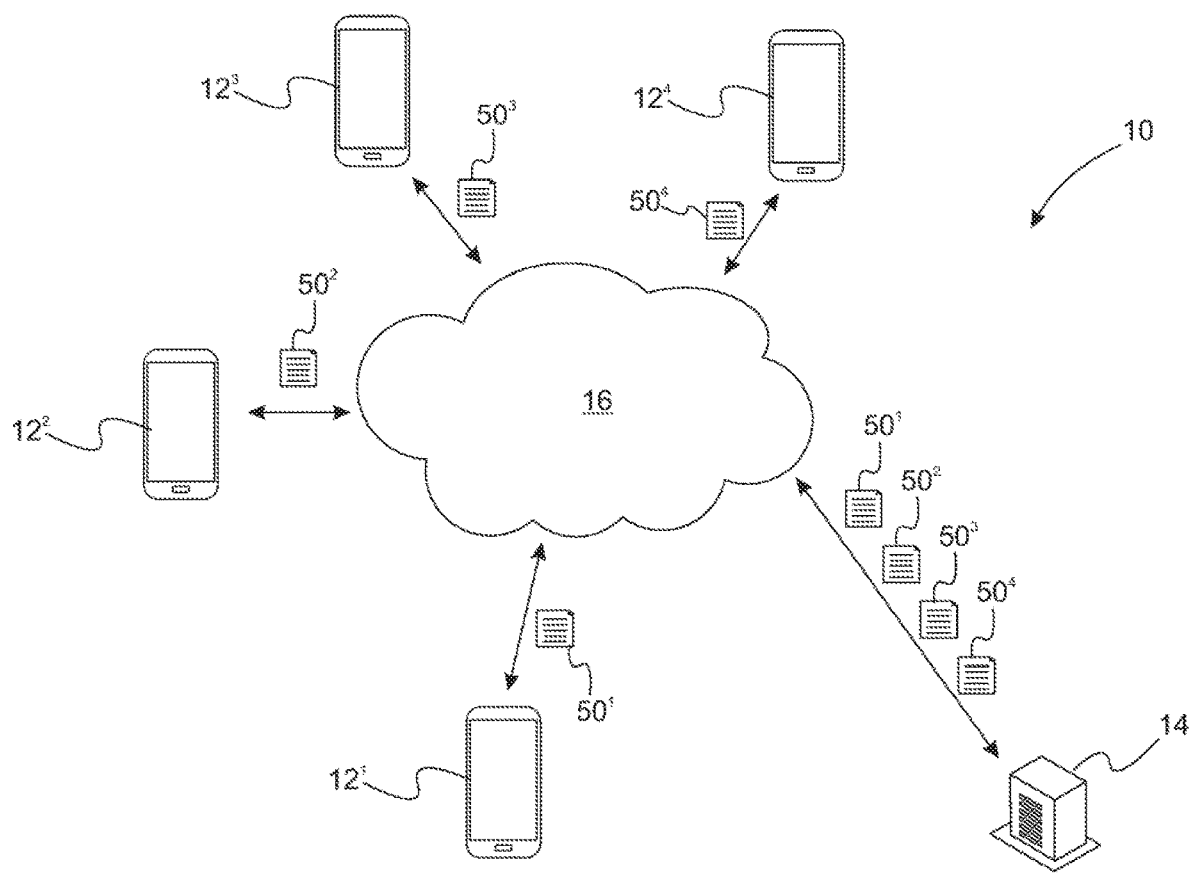
FIG. 1A: A schematic a SEALANT system.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of" and "consisting essentially of" where one of these three terms is used herein, the presently disclosed and claimed subject matter can include the use of either of the other two terms.

Throughout this application, where publications are referenced, the disclosures of these publications in their entireties are hereby incorporated by reference into this application to more fully describe the state of the art to which this invention pertains.

The term "computing device" refers generally to any device that can perform at least one function, including communicating with another computing device. Examples of computing devices includes any computer, computing device, mobile phone, desktop computer, notebook computer or laptop computer, distributed system, blade, gateway, switch, processing device, or combination thereof adapted to perform the methods and functions set forth herein.

The term "app" means an application and in particular, an application downloaded by a mobile device such as a smart phone.

When a computing device is described as performing an action or method step, it is understood that the computing devices is operable to perform the action or method step typically by executing one or more line of source code. The actions or method steps can be encoded onto non-transitory memory (e.g., hard drives, optical drive, flash drives, and the like).

Abbreviations

"APK" means Android Package Kit.
"ICC" means inter-component communication.
"RAM" means random access memory.
"ROM" means read only memory.

In general, systems and methods for providing increased security in a mobile operating system on a mobile device are provided Sometimes the methods and systems of the present invention are referred to as "SEALANT."

With reference to FIG. 1, an embodiment of a system and method for providing increased security in a mobile operating system on a mobile device (e.g., a smart phone) is schematically illustrated. SEALANT system 10 includes one or more mobile devices 12' where i is an integer label for each mobile device associated with the present system. In a refinement, SEALANT system 10 further includes remote computing device 14 that interacts one or more mobile devices 12'. The optional remote computing device 14 is remote from mobile devices 12. The remote computing device is sometimes referred to as "an optional remote computing device" since there are variations that do not required it to perform any steps of the SEALANT method. In this regard, there are variations wherein steps indicated as being performed by the "mobile device or the optional remote computing device" are performed by the mobile device without the involvement of the remote computing device. Similarly, there are variations where steps indicated as being performed by the "mobile device or the optional remote computing device" are performed by the remote computing device. Therefore, the SEALANT system of these latter variations includes remote computing device 14. Remote computing device 14 when present communicates over network 16 can be a cellular network, the Internet, a public or private cloud, or combinations thereof.

Figure 1B:
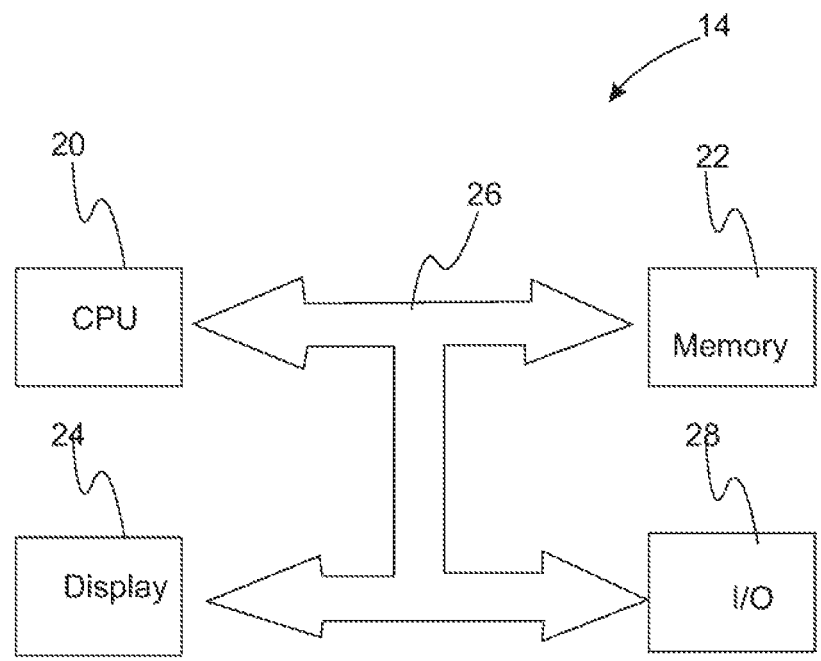
FIG. 1B: Schematic of a remote computing device used in the system of FIG. 1A.

As depicted in FIG. 1B, optional remote computing device 14 typically includes computer processor 20 that executes one or more steps of the SEALANT framework as set forth below. It should be appreciated that virtually any type of computer processor may be used, including microprocessors, multicore processors, and the like. The instructions for the method typically are stored in computer memory 22 and accessed by computer processor 20 (e.g., a microprocessor) via connection system 24. In a variation, connection system 24 includes a data bus. In a refinement, computer memory 22 includes a computer-readable medium which can be any non-transitory (e.g., tangible) medium that participates in providing data that may be read by a computer. Specific examples for computer memory 22 include, but are not limited to, random access memory (RAM), read only memory (ROM), hard drives, optical drives, removable media (e.g. compact disks (CDs), DVD, flash drives, memory cards, etc.), and the like, and combinations thereof. In another refinement, computer processor 20 receives instructions from computer memory 22 and executes these instructions, thereby performing one or more processes, including one or more of the processes described herein. Computer-executable instructions may be compiled or interpreted from computer programs created using a variety of programming languages and/or technologies including, without limitation, and either alone or in combination, Java, C, C++, C#, Fortran, Pascal, Visual Basic, Java Script, Perl, PL/SQL, etc. Display 24 is also in communication with computer processor 20 via connection system 26. Optional remote computing device 14 also includes various in/out ports 28 through which data from a keyboard and a pointing device may be accessed.

Figure 1C:
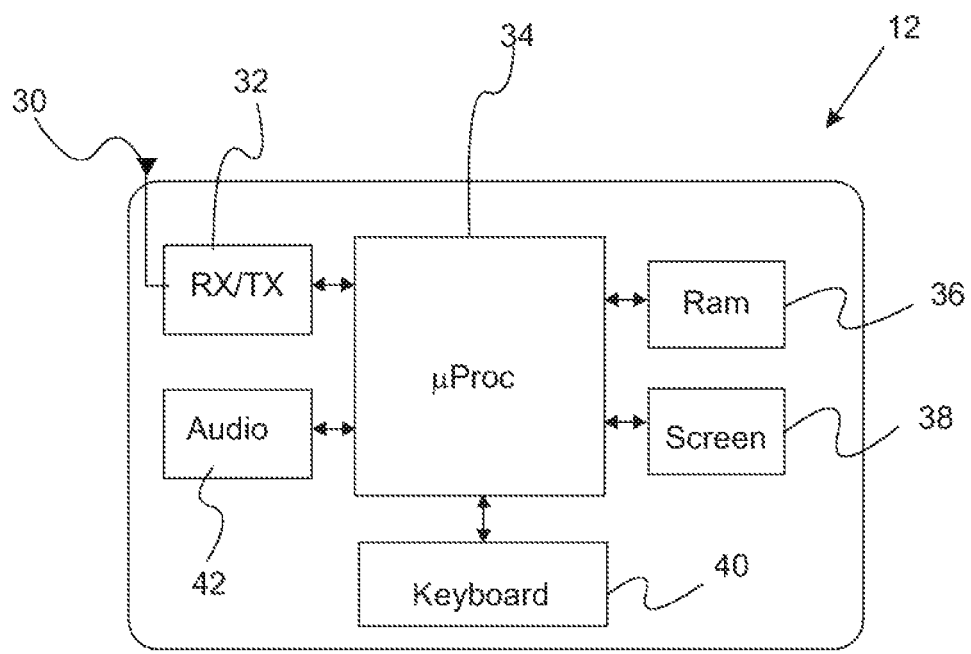
FIG. 1C; Schematic of a mobile device used in the system of FIG. 1A.

FIG. 1C provides an idealized schematic of a mobile device that can be used in SEALANT system 10. Mobile device 12 includes antenna 30 in electronic communication with transceiver system 32. Mobile processor 34 is in electronic communication with transceiver system 32, computer memory 36, screen 38 (e.g., a touch screen), keyboard 40, and audio system 42. Mobile processor 4 communicates with each of these components via the appropriate interfaces and buses as in known to those skilled in the art. In a refinement, computer memory 36 includes a computer-readable medium which can be any non-transitory (e.g., tangible) medium that participates in providing data that may be read by mobile processor 34. Specific examples for computer memory 22 include, but are not limited to, random access memory (RAM), read only memory (ROM), flash memory, and the like, and combinations thereof.

Mobile device 12 or optional remote computing device 14 receives and/or identifies two or more applications that are currently installed or intended to be installed on a mobile operating system on each mobile device 12'. In a refinement, a list 50' of two or more applications is transmitted to and received by optional remote computing device 14. Characteristically, the mobile operating system includes a module that manages the routing of intents among components of the two or more applications. An example of such an operating system is Android™ available from Google of Mountain View, Calif. Mobile device 12 or optional remote computing device 14 identifies vulnerable inter-component communication (ICC) paths between components of the two or more applications installed on the mobile operating system by analyzing files associated with each of the two or more applications. Information obtained from this analysis is sent to mobile device 12. In a refinement, a vulnerable ICC path is defined as a path between a component of one of the two or more applications and a sensitive method. A list of the vulnerable ICC paths is stored on the mobile device 12' (i.e., in memory 36) and/or on optional remote computing device 14 (e.g., in memory 22). Mobile processor 34 is operable to compare the list of the vulnerable ICC paths to intents sent by the components of the two or more applications. Mobile processor 34 is also operable to identify a potential unsecure intent that matches one of the list of the vulnerable ICC paths. Mobile device 12 includes an output component (e.g., screen 38) that outputs output data requesting confirmation that the potential unsecure intent is authorized. An input component (e.g., screen 38 and/or keyboard 40) of the mobile device receives user input confirming or denying authorization of the potential unsecure intent. Mobile processor 34 is operable to block the potential unsecure intent when the user input denies the authorization of the potential unsecure intent.

In a refinement, the user input includes a selection of one of a single time authorization of the potential unsecure intent, a single time denial of the authorization, a permanent authorization of the potential unsecure intent, or a permanent denial of the authorization.

In another refinement, a choice database is stored in memory 36 of mobile device 12 which includes previous potential unsecure intents and whether each of the previous potential unsecure intents corresponds to the permanent authorization of the potential unsecure intent or the permanent denial of the authorization.

In still another refinement, the mobile processor 34 determines, that a new intent matches an entry in the choice database and then blocks the new intent when the entry corresponds to the permanent denial of the authorization. In a further refinement, the mobile processor 34 allows the output component to output the output data when the entry corresponds to the permanent authorization of the potential unsecure intent. In this latter refinement, mobile processor 34 can request confirmation.

In a variation, the step of identifying the vulnerable ICC paths includes identifying a path that is vulnerable to at least one of intent spoofing, unauthorized intent receipt, or privilege escalation.

In another variation, the mobile device or optional remote computing device is further operable to identifies that a new application has been installed on the mobile operating system and to identify additional vulnerable ICC paths between new components of the new application and the components of the two or more applications. The additional vulnerable ICC paths are stored in memory 22 of the optional remote computing device or memory in the mobile device.

In another variation, the step of identifying the vulnerable ICC paths by analyzing the files includes analyzing APK files associated with each of the two or more applications.

In another variation, the mobile device and/or optional remote computing device 14 is operable to visualize potential ICC paths and vulnerable ICC paths. Details of this visualization are set forth below.

Figure 2:
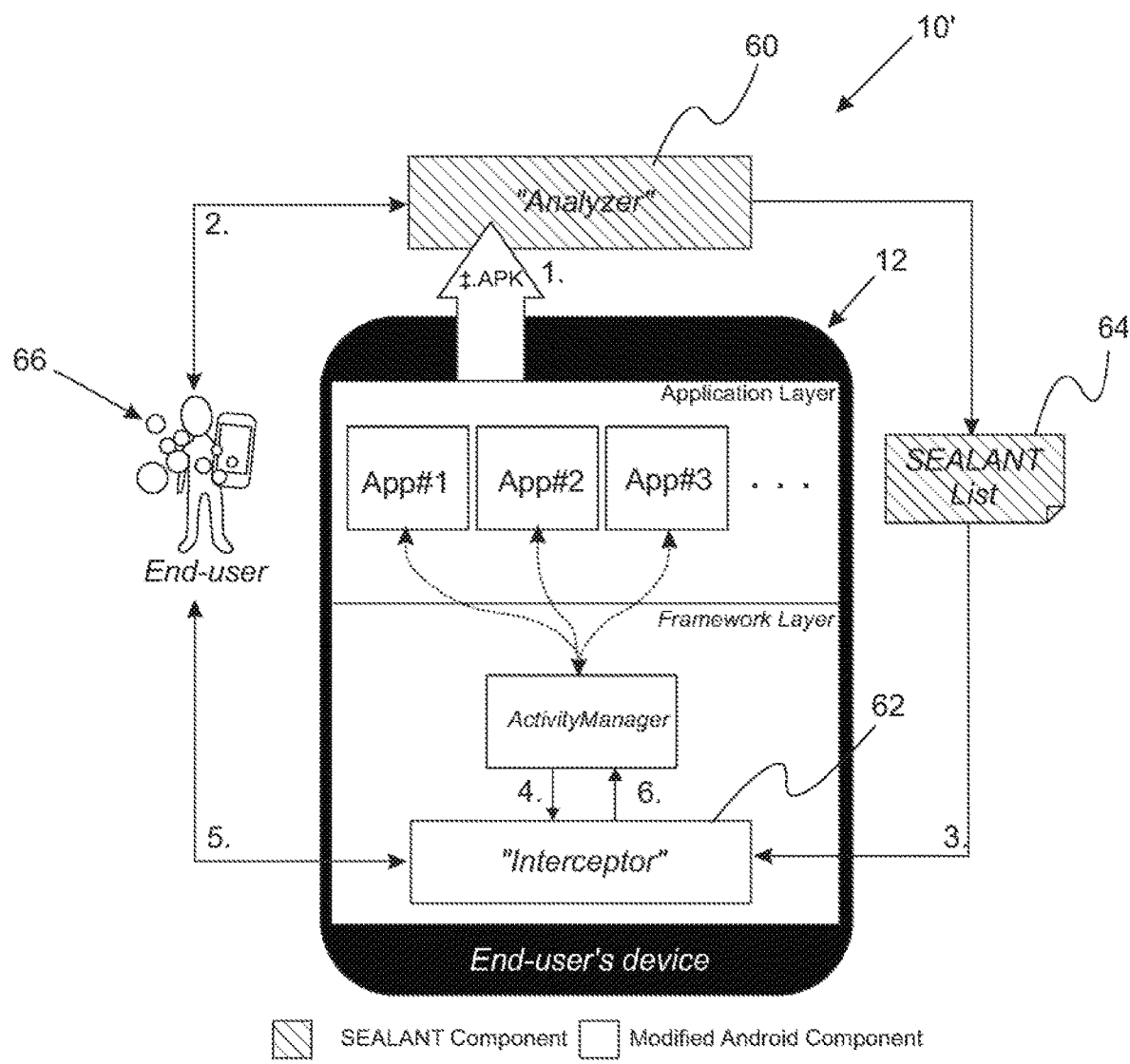
FIG. 2: Overview of SEALANT's Operation.

FIG. 2 provides a variation of the system of FIG. 1. SEALANT system 10' applies two components for implementing the method for providing increased security in a mobile operating system on a mobile device 12—Analyzer 60 and Interceptor 62. Analyzer applies static analysis to generate a list 64 of vulnerable ICC paths between apps depicted as App #1, App #2, App #3, etc. Analyzer typically runs on a user's computer or as an online service. Interceptor 62 extends the mobile operating system (e.g., Android) on mobile device 12 to perform runtime monitoring and enable advanced ICC control such as blocking of specific ICCs identified by Analyzer. In a refinement, Analyzer 60 processes the files (e.g., APK files in Android) of the installed apps and identifies the vulnerable ICC paths between them. In a refinement, analyzer 60 can optionally contact expert users to confirm specific vulnerable paths that should be monitored. Analyzer feeds identified vulnerable ICC paths to the Interceptor in a pre-defined format for list 64 (SEALANT List). At runtime, whenever an intent is sent, Interceptor 62 captures the information of the corresponding ICC path (e.g., sender's name). If the captured path information matches one of the vulnerable paths in the SEALANT List, Interceptor 62 contacts the end-user 66 to determine whether to propagate the intent. Based on the end-user's choice, Interceptor will instruct the mobile operating system either to block or to route the intent. Additional details for Analyzer 60 and Interceptor 62 are set forth below.

Figure 3:
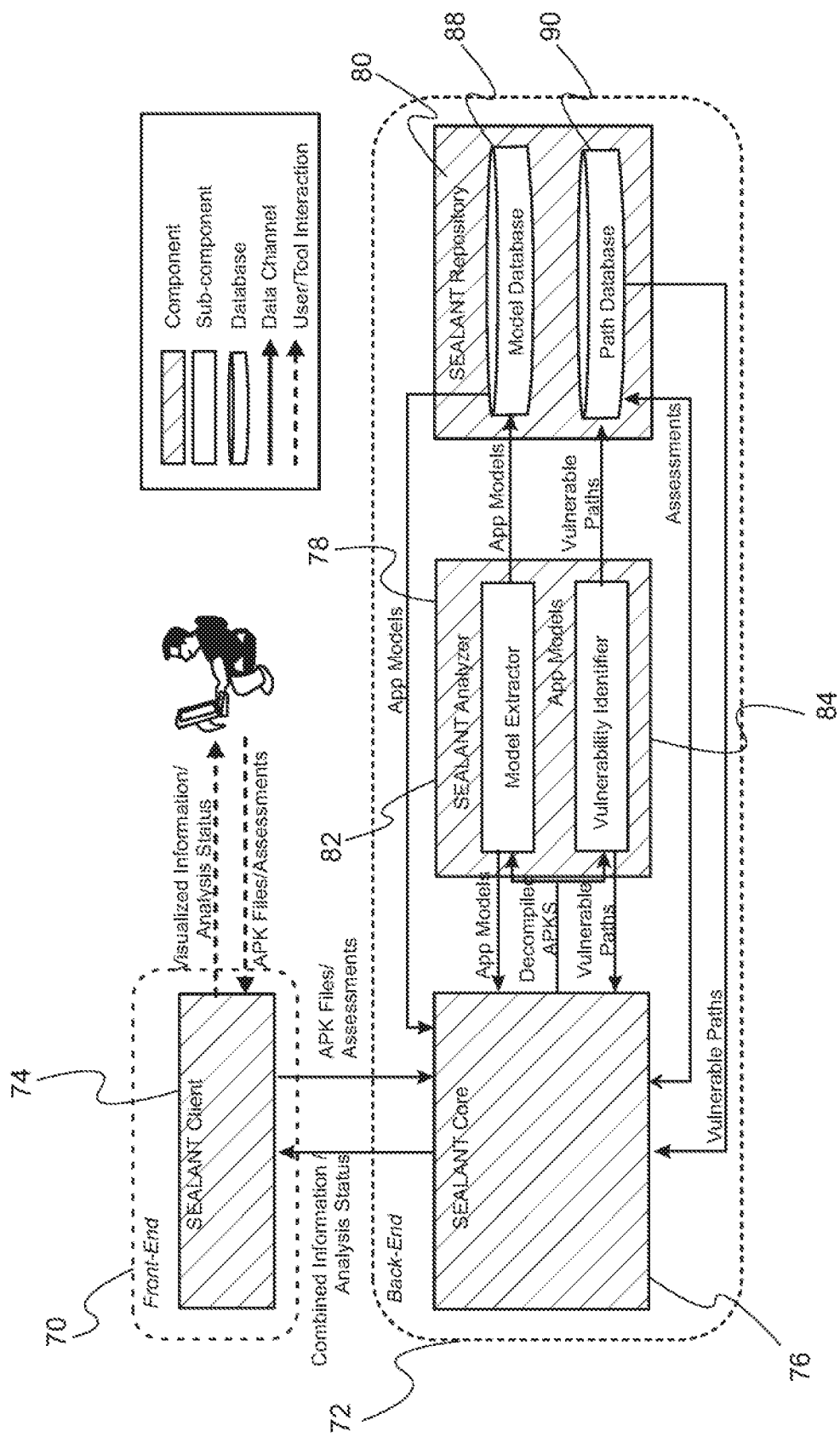
FIG. 3: Two layer SEALANT Architecture

In another variation, a system for providing increased security in a mobile operating system on a mobile device is provided. The system includes one or more computing devices operable to execute steps of: a) providing an interactive user interface; b) extracting vulnerable ICC paths from target apps as extracted information; c) managing the extracted information; d) transforming the extracted information into a visually representable format; and e) displaying at least a portion of the extracted information from the visually representable format. Characteristically, the visually representable format provides for a graphical display of at least a portion of the extracted information. In a refinement, the one or more computing devices define a front-end that executes steps a) and e) and a back-end that executes steps b), c), and d). In another refinement, a client computing device is operable to provide the interactive user interface and display the extracted information to a user. FIG. 3 depicts an example of this variation in which SEALANT operates with a two-layer design having front-end 70 and back-end 72. The two-layer design can be implemented by one or more computing devices. For example, the front-end might be implemented by a user's computer and the back-end by another computer or server optionally operated by a third party. Front-end 70 is responsible for providing the interactive user interface. Client component 74 belongs to this layer. Back-end 72 is responsible for identifying vulnerable ICC paths from target apps, managing the extracted information, and transforming the information into a visually representable format. The back-end 72 includes three main components: Core 76, Analyzer 78, and SEALANT Repository 80. Analyzer 78 in this variation is example of the analyzer set forth above. Client 74 facilitates a user's interaction with the back-end layer 72. Once the user selects a set of application related files (e.g., APK files) that were automatically pulled from the user's device or manually downloaded from online app stores, Client 74 forwards the files to the core 76 and informs the user of the analysis status (e.g., displaying the analysis progress). Client 74 renders the combined information obtained from the Core 76 (i.e., app models and identified vulnerable ICC paths) in tailorable visual notations. Client 74 provides interactive interfaces that provides visualizations of the ICC paths and enables users to customize display settings (e.g., size, font, and color) or highlight particular architectural elements (e.g., component or ICC path). Client 74 optionally contacts users to assess each vulnerable ICC path. In refinement, a user's assessment can reduce the falsely identified paths in subsequent analyses. Core 76 is responsible for controlling every operation and transforming the analyzed information into a visually representable format. It handles every request from the client. Core 76 subsequently combines and transforms the app models and vulnerable ICC paths it receives back from the Analyzer into a pre-defined format. Core 76 also stores the user's assessments received from the client 74 in Repository 80.

Analyzer 78 extracts each app's architectural information and summarizes the information as a model of each app. Analyzer 78 identifies vulnerable ICC paths between the apps using data-flow analysis and ICC pattern matching. It consists of two sub-components: Model Extractor 82 and Vulnerability Identifier 84. Model Extractor inspects each app's manifest file and bytecode to extract the app's architectural information (e.g., components, intent filters, permissions, and intents). For each app component, Model Extractor 82 performs data-flow analysis between sensitive APIs and ICC-call APIs. A component that contains such a data-flow is marked as a vulnerable component. Model Extractor 82 then builds a summary based model that captures the information of each app, and stores every model in repository 80 for reuse in subsequent analyses.

Vulnerability Identifier 84 analyzes vulnerable ICC paths from a set of app models. To this end, it first builds an ICC graph by matching intents and intent filters of each component. In an ICC graph, a node represents a component and an edge is defined as a tuple <s,r,i>, where s is a sender and r a receiver component, and i is an intent between them. The ICC graph is traversed and marks an edge marked as vulnerable based on two criteria: (1) if there is a vulnerable component at one or both ends and (2) if it is a part of a particular compositional ICC patterns that may be vulnerable to inter-app attacks. Specifically, two different edges (one across apps and the other one within an app) that direct to the same component with the same type of intent represent a vulnerable ICC pattern susceptible to intent spoofing. Conversely, two different edges (one across apps and the other one within an app) that start from the same component with the same type of intent represent a vulnerable ICC pattern susceptible to unauthorized intent receipt. The identified vulnerable ICC paths are stored in the repository 80 for reuse in subsequent analyses.

Repository 80 maintains the extracted app models in its Model Database sub-component 88 and the identified vulnerable ICC paths in the Path Database sub-component 90. Model Database manages each app's model by its package name and versions in order to enable reusing the extracted information for further analyses. When apps are installed or updated on a user's device subsequent to running SEALANT, SEALANT extracts the architectural information only from the installed or updated apps, and reuses the prior analysis results for the rest. Path Database maintains the identified vulnerable ICC paths. For each vulnerable ICC path, it also maintains each user's assessment that indicates whether the ICC path is indeed exposed to inter-app attacks or not.

Figure 4A:
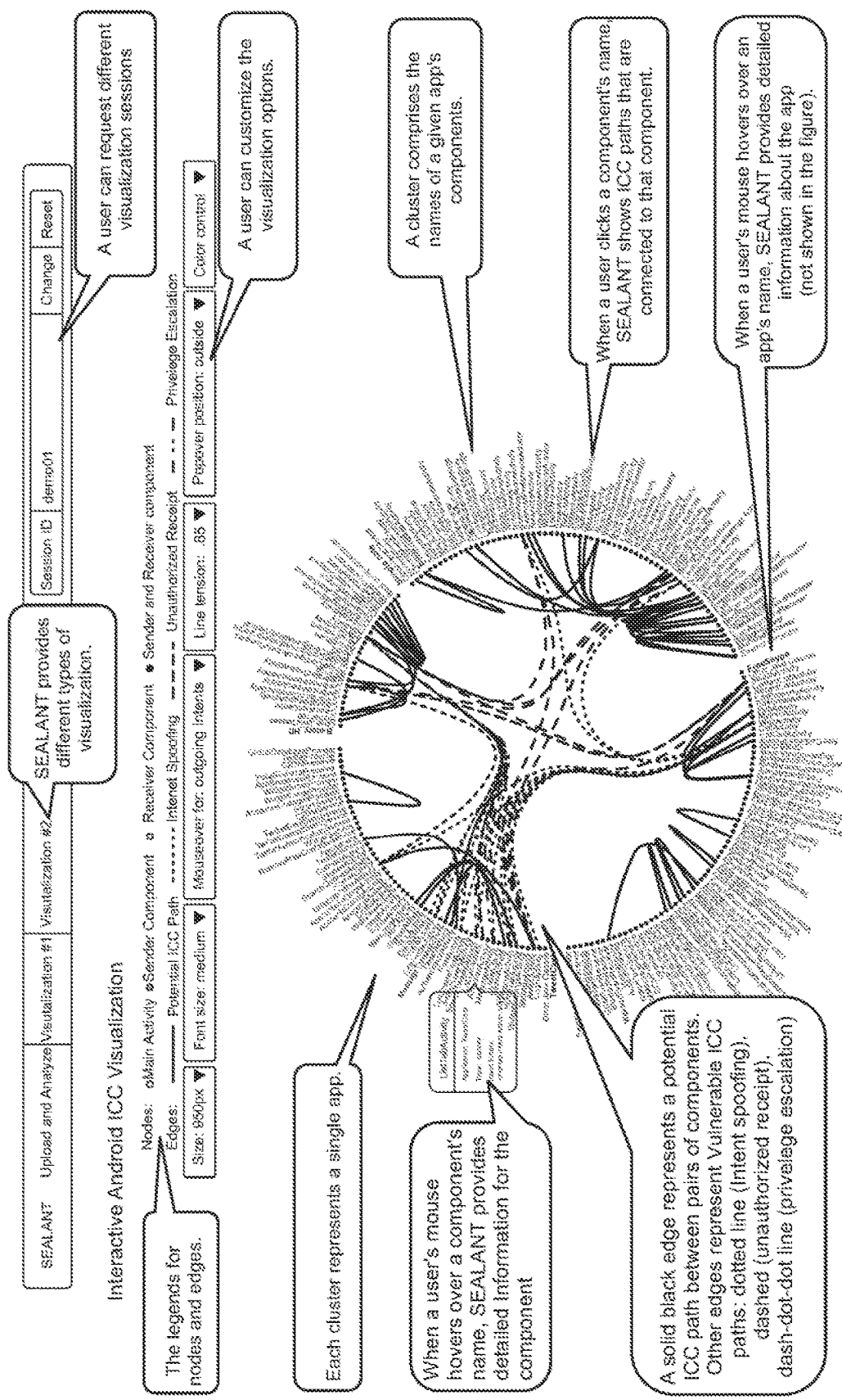
FIGS. 4A and 4B: Two Different Screenshots of SEALANT's User Interface
Figure 4B:
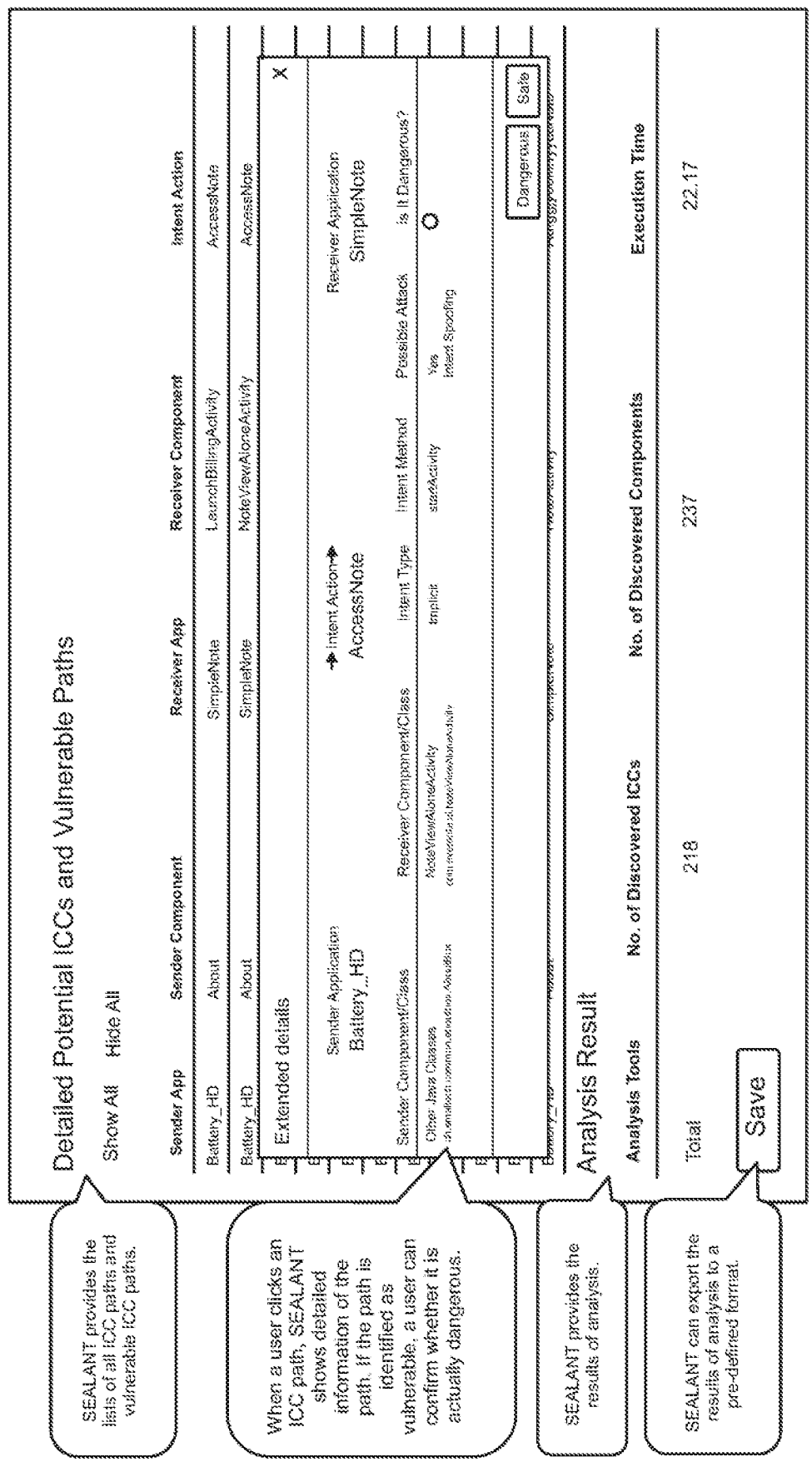

As set forth above, client 76 can provide visualization of the ICC analysis with the visually representable format providing for a graphical display of at least a portion of the extracted information. In this regard, each app is displayed as a cluster of app components defined by a plurality of visual labels (e.g., circles, squares, triangles, etc.) with each visual label representing an app component with ICC paths represented by lines connecting a pair of visual labels, with each line having a display property that characterizes an associated vulnerability. In a refinement, a first line type is displayed for a vulnerable ICC path, a second line type is displayed for intent spoofing, a third line type is displayed for unauthorized intent and a fourth line type is displayed for privilege escalation. Characteristically, the first line type, the second line type, the third line type and the fourth line type are visually different. For example, the first line type, the second line type, the third line type and the fourth line type each can be displayed with different colors. FIG. 4 provides an example of such visualization. In this example, each component is depicted as a labeled dot, each app as a cluster of components, and each ICC path between a pair of components as a solid black line connecting the respective dots. The vulnerable ICC paths are presented as dotted and dashed lines: potentially vulnerable ICC paths are solid lines, intent spoofing is a dotted line, unauthorized intent receipt is a dashed line, and privilege escalation is dash-dot-dot line. A user can customize display options such as font size, display size, and line tension. As part of the visualization feature, if a user hovers the pointer over an app or a component name, SEALANT shows its detailed information, such as type, intent filters, and permissions. As shown in FIG. 4(B), SEALANT also presents detailed information for each vulnerable ICC path, and a user can assess whether a given path is unsafe or not. The user assessments can provide a reference point for future analyses, as detailed below. In a refinement, a selective visualization that allows a user to focus on a particular set of apps, components, or vulnerabilities can be used. For example, if a user clicks on a desired component's name, SEALANT highlights the ICC paths (and the corresponding components) that are connected to it, and fades out the other parts. SEALANT also enables users to choose different visualization types that use different notations and topologies.

Additional details of the present invention are set forth below and in Y. K. Lee, P. Yoodee, A. Shahbazian, D. Nam and N. Medvidovic, "SEALANT: A Detection and Visualization Tool For Inter-App Security Vulnerabilities In Android," 2017 32nd *IEEE/ACM International Conference on Automated Software Engineering (ASE)*, Urbana, Ill., 2017, pp. 883-888. doi: 10.1109/ASE.2017.8115699; and Y. K. Lee, J. y. Bang, G. Safi, A. Shahbazian, Y. Zhao, and N. Medvidovic, "A SEALANT for Inter-app Security Holes in Android," in *Proceedings of the 39th International Conference on Software Engineering (ICSE)*, 2017; the entire disclosures of which is hereby incorporated by reference. It should be appreciated that the analysis directed below is applicable to any mobile operating system that includes a module that manages routing of intents among components of the two or more applications. In this regard, Android is merely an example of such an operating system.

1. The Sealant System Having Analyzer and Interceptor

I. MOTIVATING EXAMPLES

In this section, simplified examples of the three inter-app attack types that SEALANT targets: (1) intent spoofing, (2) unauthorized intent receipt, and (3) privilege escalation are presented.

Figure 6:
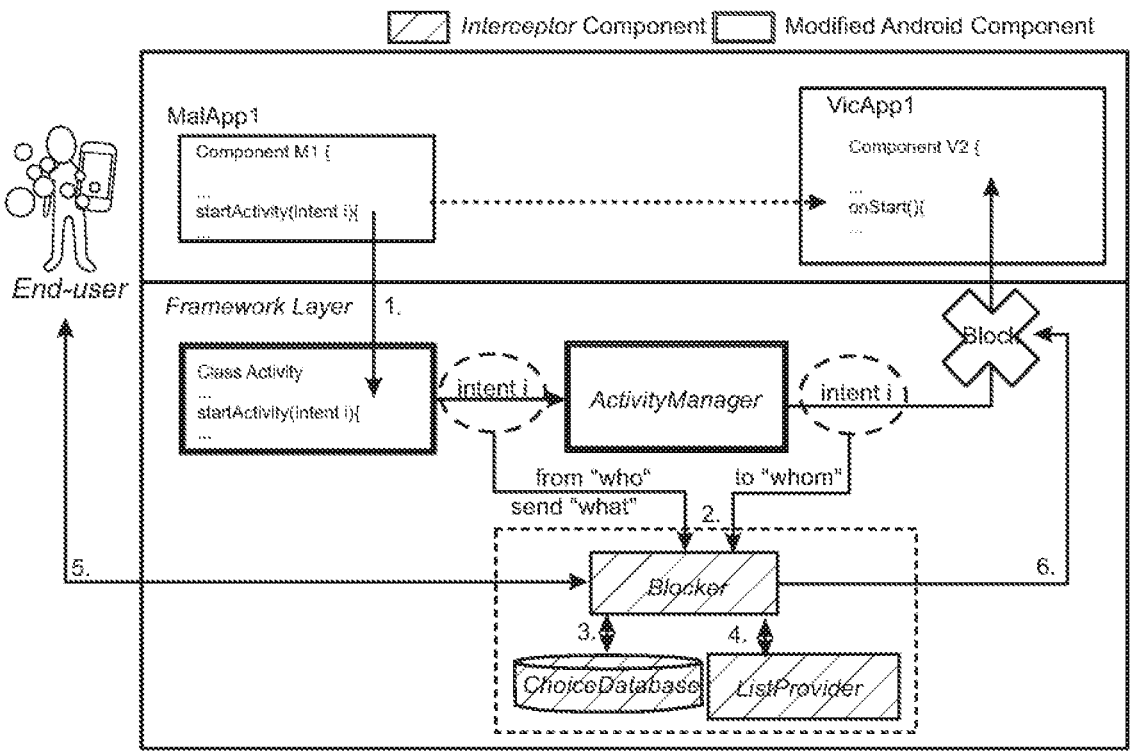
FIG. 6: The Architecture and Operation of Interceptor.

FIG. 5(A) and Listings 1 and 2 in FIG. 6 depict intent spoofing as it may be implemented on the Android platform. Analogous examples would occur on other mobile platforms. FIG. 5(A) shows component M1 from malicious app MalApp1 that may send an intent to component V2 from victim app Vic-Appl. Listing 1 shows where VicApp1's vulnerability resides: V2 is designed to transfer money to a recipient specified by an incoming intent. Listing 2 illustrates how M1 of MalApp1 sends an explicit intent that specifies V2 as its destination component, along with the attacker's account number as the recipient. This is an example of a vulnerable ICC path, from M1 to V2.

Listing 1: Component V2 of VicApp1

```
1 public class V2 extends Activity {
2 public void onStart( ) {
3 Intent i = getIntent( );
4 String recipient = i.getStringExtra("Recipient");
5 String amount = i.getStringExtra("Amount_USD");
6 sendMoneyToRecipient(recipient, amount); }}
```

Listing 2: Component M1 of MalApp1

```
1 public class M1 extends Activity {
2 public void onCreate ( Bundle savedInstanceState ) {
3 Intent i = new Intent( );
4 i.setClassName("com.VicApp1", "com.VicApp1.V2");
5 i.addFlags(Intent.FLAG_ACTIVITY_NEW_TASK);
6 i.putExtra("Recipient", ATTACKERS_ACCOUNT_NUMBER});
7 i.putExtra("Amount_USD", 1000000);
8 startActivity(i); }}
```

Listing 3: Component V3 of VicApp2

```
1 public class V3 extends Activity {
2 public void onClick(View v) {
3 LocationManager m = (LocationManager)
  getSystemService(Context.LOCATION_SERVICE);
4 Location location =
5 m.getLastKnownLocation(LocationManager.GPS_PROVIDER);
6 Intent i = new Intent( ) ;
7 i.setAction ("ShowLocation");
8 i.putExtra ("Location", location.toString( ));
```

FIG. 5(B) and Listing 3 illustrate unauthorized intent receipt. In Android, if an intent is broadcast without proper permission restrictions, a malicious component can receive it by declaring attributes matching those of the intent. Component V3 of VicApp2 from FIG. 5(B) is designed to broadcast intents to components in the same app such as V4. Listing 3 shows V3's code that broadcasts an implicit intent on a click event, with the action attribute ShowLocation and the location information. Although not an intended receiver, malicious component M2 of MalApp2 is able to eavesdrop by listening to ShowLocation intents and to obtain the user's current location. This is another example of a vulnerable ICC path, from V3 to M2.

FIG. 5(C) depicts privilege escalation. Component V6 of VicApp3 provides a sensitive API that is protected with permission P1. While component V8 of VicApp4 is granted P1, M3 of MalApp3 is not, which means that M3 is restricted to directly access the API of V6. Nonetheless, M3 can still invoke the API in an indirect way, via V8 which is not protected by any permissions and can be triggered by any component via an explicit intent. By triggering V8, M3 is able to access the sensitive API of V6 without acquiring P1. This is an example of a transitive vulnerable ICC path, from M3, via V8, to V6.

The above examples demonstrate that the attacks are administered in a way that does not differ from ordinary intent exchanges between apps. This makes the identification and restriction of inter-app attacks especially challenging. Moreover, since an ICC can be performed in an essentially invisible way (e.g., via sendBroadcast( ) or through transitive paths), it is difficult for end-users to recognize when the attacks are actually committed. An app developer's caution may minimize the risk of the attacks, but it requires error-prone manual effort, while end-users may still download other unsafe apps.

Although security violations such as these have been studied in computer networks and distributed systems [17]-[22], those techniques cannot be directly applied to Android due to the specifics of its communication mechanism and features. For example, role-based access control [17], [18] has been applied in Android as a form of permission grants; however, it can be violated by privilege escalation attacks. Encryption [19], [20], another popular technique, is not a good fit for Android due to encryption-key distribution issues and limited mobile resources. Meanwhile, techniques specifically targeting Android have either not focused on these issues or have been unable to adequately resolve them.

II. SEALANT

SEALANT is a technique that automatically identifies vulnerable ICC paths between Android apps, and enables users to control the ICCs on those paths at runtime. SEALANT recognizes each instance of ICC as a relation between a sender, a receiver, and an intent. When an intent from a sender component matches an intent that can be received by a receiver component (either explicitly or through an intent filter), SEALANT reports an ICC relation. SEALANT builds an ICC graph in which vertices are components and edges are the ICC relations. It then extracts all possible vulnerable ICC paths in the ICC graph and monitors them at runtime. When an instance of ICC matches one of the extracted vulnerable paths, SEALANT may block it based on the user's choice.

FIG. 2 shows two key components that comprise SEALANT: (1) Analyzer uses static analysis to generate a list of vulnerable ICC paths between apps, and runs on a user's computer or as an online service; (2) Interceptor extends Android to perform runtime monitoring and enable advanced ICC control such as blocking of specific ICCs identified by Analyzer. SEALANT's overall process is as follows:

1) Analyzer processes the APK1 files of the installed apps and identifies the vulnerable ICC paths between them.

2) Analyzer can optionally contact expert users to confirm specific vulnerable paths that should be monitored.

3) Analyzer feeds the highlighted vulnerable ICC paths to the Interceptor in a pre-defined format (SEALANT List).

4) At runtime, whenever an intent is sent, Interceptor captures the information of the corresponding ICC path (e.g., sender's name) from Android's ActivityManager.2

5) If the captured path information matches one of the vulnerable paths in the SEALANT List, Interceptor contacts the end-user to determine whether to propagate the intent.

6) Based on the end-user's choice, Interceptor will instruct the ActivityManager either to block or to route the intent. We discuss Analyzer and Interceptor in more detail next.

A. Analyzer

Analyzer performs static analysis on APK files in four phases: (1) analyze target apps, (2) build ICC graph, (3) find vulnerable paths, and (4) generate SEALANT List. Analyzer is novel in that it returns multiple types of vulnerable ICC paths in a single pass and distinguishes different types of threats, which enables tailor-made countermeasures. It does so by focusing, both, on the data-flow between components and on compositional patterns of ICCs derived from published literature [2]. This enables Analyzer to identify a larger number of vulnerable paths and path types than existing techniques (e.g., paths involving custom methods). Its summary-based model enables analyzing a number of apps at a time, as well as reusing prior analysis results when apps are installed, updated, or removed.

1) *Analyze Target Apps:*

Analyzer extracts and summarizes each app's architectural information by analyzing the APK file. The summary includes components, intents, intent filters, and permissions. Analyzer extracts each component's name, package, permissions held or required, and exported status. To communicate across apps, an Android component must have its exported status set to true or contain an intent filter. Analyzer only considers exported components in creating ICC graphs. Analyzer extracts each intent's attributes (i.e., target component, action, categories, and data) using string constant propagation [23]. If an attribute's value cannot be determined, Analyzer conservatively assumes it to be any string.

Once extraction is completed, Analyzer examines each component's vulnerability. A vulnerable component is the one containing an intra-component path between an ICC call method and a sensitive method. An ICC call method is a standard Android method for sending or receiving intents (e.g., startActivity( ) [24]. A sensitive method is an Android API method that can access sensitive user information (e.g., getLastKnownLocation( ) or trigger a sensitive operation (e.g., sendTextMessage( ) [25], [26]. Analyzer identifies the relevant paths by employing a static taint analysis that tracks data-flows between methods [27]. If the direction of an intracomponent path is from an ICC call method to a sensitive method, Analyzer sets the component's vulnerability type to Active, because the component is vulnerable to attacks such as intent spoofing and privilege escalation. If the intra-component path is from a sensitive method to an ICC call method, the vulnerability type is Passive, representing attacks such as unauthorized intent receipt. In FIG. 5(B), for example, the vulnerability type of V3 is Passive, because the location data directs from getLastKnownLocation( ) to sendBroadcast( ). If a component has multiple intra-component paths, Analyzer creates separate component models for each path.

By managing a summary-based model of each app, Analyzer is scalable to inspecting a number of apps in a single pass, as evaluated in Section IV-C1. Furthermore, when apps are installed or updated subsequent to running Analyzer, Analyzer extracts only the architectural information from the newly updated apps and reuses the prior analysis results on the rest.

2) Build ICC Graph:

With the extracted information, Analyzer builds an ICC graph based on the rules from Android's API reference documentation [28]. It defines an edge as a tuple <s, r, i>, where s is a sender and r a receiver component, and i is an intent between them. Component and intent are entities that manage summarized information as shown in Table I.

TABLE I

Attributes of component and intent in ICC graph

| Entity | Attributes | Description |
|---|---|---|
| component | Name | The name of the component |
| | Pkg | The name of the package to which the component belongs |
| | VulType | The type of vulnerability (i.e., Active, Passive, or null) |
| | VulMeth | The name of the sensitive method (e.g., sendTextMessage( )) |
| | PermUse | The name of the permission that the component holds |
| | PermReq | The name of the required permission to access the component |
| intent | Target | The name of the component to which the intent is directed |
| | IntentAttr | The intent's attributes: action, category, data type, and data scheme |
| | Sender | The name of the component which sends the intent |
| | SenderPkg | The name of the package to which the sender component belongs |

Since the extraction of architectural information is performed in a conservative way (specifically, relying on attributes of intents), the set of edges may include false positives. However, this will not affect SEALANT's runtime accuracy because no ICC instances to be routed via those edges will ever be initiated.

3) Find Vulnerable Paths:

Analyzer implements Algorithm 1 on the ICC graph to identify vulnerable paths. Analyzer marks an edge as vulnerable (1) if it has a vulnerable component at one or both ends, or (2) if it forms a particular compositional pattern. To find vulnerable transitive ICC paths, Analyzer recursively identifies a set of connected edges that can access a vulnerable component by calling the PathFinder method (Algorithm 2). xy indicates attribute y of entity x (depicted in Table I), and x:y represents element y in edge x.

---

Algorithm 1: Identifying vulnerable ICC paths

```
Input: G ⇐ an ICC graph
Output: VulPaths ⇐ a set of vulnerable paths
1  Let IAC be a set of IAC edges in G
2  Let ICC be a set of ICC edges in G
3  Let s be a sender component
4  Let r be a receiver component
5  foreach e ∈ IAC∪ICC do
6  |   s ⇐ e.sender
7  |   r ⇐ e.receiver
8  |   if (r_VulType = "Active") then
9  |   |   if e ∈ IAC then
10 |   |   |_  add ({e},PermCompare(s,r,r_VulMeth)) to VulPaths
11 |   |_  PathFinder(s,r,{e})
12 |   else if (s_VulType = "Passive") and (e ∈ IAC) then
13 |   |_  add ({e},"unauthorized intent receipt") to VulPaths
14 |   else if (e ∈ IAC) then
15 |   |   foreach (g ∈ ICC) do
16 |   |   |   if (r = g.receiver) then
17 |   |   |   |_  add ({e},"intent spoofing") to VulPaths
18 |   |   |   else if (s = g.sender) ∧ (e.intent = g.intent) then
19 |   |   |   |_  add ({e},"unauthorized intent receipt") to VulPaths
```

---

Algorithm 2: PathFinder

```
Input: s,r ⇐ component, E ⇐ a list of distinct edges
Output: updated VulPaths
1  foreach f ∈ IAC ∪ ICC do
2  |   if (f.receiver = s) and (∀e ∈ E, e.receiver ≠ f.sender) then
3  |   |   append f to E
4  |   |   if (∃e ∈ E, e ∈ IAC) then
5  |   |   |_  add (E,PermCompare(f.sender,r,r_VulMeth)) to VulPaths
6  |   |_  PathFinder(f.sender,r,E)
7  remove the last element of E
```

Analyzer first parses edges into two sets: inter-app (IAC) for edges between components belonging to different apps, and inter-component (ICC) otherwise. Algorithm 1 iterates over each edge e in IAC ∪ ICC (lines 5-19) and considers four different cases that cover all types of vulnerable paths we target in this paper: the first two cases identify paths that involve vulnerable components; the latter two cases identify paths based on previously identified compositional patterns [2].

Case 1 (line 8) occurs when e directs to a receiver vertex whose vulnerability type is "Active". If e is an IAC edge, Algorithm 1 determines the type of attack by calling Perm-Compare($c_1,c_2$,m) (line 10), a method that returns the type of attack by comparing the permissions of components $c_1$ and $c_2$, where m is a sensitive method that forms an intracomponent path with an ICC call method within $c_2$. If $c_2$ holds a permission that $c_1$ does not, and the permission is required to use m [26], PermCompare returns "privilege escalation"; otherwise, it returns "intent spoofing". Once the type of attack is determined, Algorithm 1 adds tel to the set VulPaths that contains all detected vulnerable ICC paths (line 10), and then calls PathFinder to identify transitive ICC paths (line 11).

As depicted in Algorithm 2, PathFinder iterates over each edge f∈IAC∪ICC, to check if f connects to the previously identified edge's sender component s, and if f's own sender is a newly visited component (line 2). If so, PathFinder appends f to the list of distinct connected edges E (line 3). If E contains an inter-app edge (e∈IAC), PathFinder determines the type of attack by calling PermCompare, and adds E to VulPaths (line 5). PathFinder recursively identifies other components that are connected to a vulnerable component through edges in the ICC graph. It stops its processing when it visits all transitively connected components to the original edge's receiver r or reaches an already visited component. When it finishes iterating, PathFinder removes the last element from E to enable correct exploration of additional transitive paths.

Case 2 (lines 12-13 in Algorithm 1) deals with the situation when the vulnerability of e:sender is Passive and e∈IAC, which may result in leaking sensitive information between apps through e. If so, the type of attack is set to "unauthorized intent receipt" and {e} is added to VulPaths (line 13).

Case 3 (lines 14-17) occurs when edges e∈IAC and g E ICC (e g) both lead to the same receiver vertex. It represents a pattern of attack in which g is an intended access to r within an app, but e may be a spoofed access from a malicious component across apps. In this case, the type of attack is set to "intent spoofing" and the edge {e} is added to VulPaths (line 17).

Case 4 (lines 18-19) occurs when edges e and g share the same sender and intent. If g represents an originally intended receipt within the app and e an unintended receipt across apps, Algorithm 1 will set the type of attack to "unauthorized intent receipt" and append {e} to VulPaths (line 19).

4) Generate SEALANT List:

As the last step, Analyzer generates the SEALANT List based on VulPaths, the output from the previous phase. Analyzer first normalizes the output by checking for redundant paths. It then transforms the information about identified paths into a pre-defined format that is compatible with SEALANT's Interceptor component.

B. Interceptor

Interceptor monitors and analyzes each instance of ICC. Whenever an ICC is requested, Interceptor checks whether it is specified in the SEALANT List. Interceptor's ICC control strategy is distinguished from competing techniques due to its finer-grained characterization of ICC paths based on (1) sender, (2) receiver, and (3) intent. As evaluated in Sections IV-A and IV-B, this increases the accuracy in blocking ICCs.

Interceptor resolves two challenging issues: (1) extracting each component's information at runtime to effectively prevent malicious ICCs, while (2) minimizing the impact on Android's functionality. Interceptor captures a sender component's information by instrumenting the framework-level class of each type of component (e.g., Activity) in the Android framework, while it captures an intent's and a receiver's information by extending a core component that governs intent routing (i.e., ActivityManager). Interceptor minimizes the impact on Android by avoiding removal of standard components or modification of core methods (further discussed in Sections III and IV-C).

1) Interceptor's Architecture:

Interceptor extends the Android framework with four components, as depicted in FIG. 6. Three components—Blocker, ChoiceDatabase, and ListProvider—are newly added, while oneActivityManager—is a modification of an existing Android component.

Blocker interacts with end-users and performs Interceptor's core functionalities: monitoring, matching, and blocking. Blocker directly communicates with ActivityManager to obtain the detailed information of each instance of ICC, and to possibly induce ActivityManager to block a particular instance of ICC. Blocker imports the SEALANT List from ListProvider, and refers to the previously made choices from ChoiceDatabase.

ActivityManager controls every instance of ICC processed through the Android framework, by collaborating with other Android components (e.g., PackageManager). We extended ActivityManager to capture the information of each ICC instance (sender and receiver components, and intent's attributes), share the information with Blocker, and block a particular instance of ICC upon Blocker's request.

ChoiceDatabase stores end-user choices (to block or route) for each vulnerable ICC path. Stored choices are automatically applied when the same ICC is requested, and can be removed upon end-user's request. When a new SEALANT List is imported, ChoiceDatabase expunges only the choices that correspond to the updated or removed apps.

Finally, ListProvider imports and maintains the SEALANT List. When a SEALANT List is installed in the pre-defined space of the user device (e.g., external SD card), ListProvider imports it and maintains the specified information as a permanent condition until a new SEALANT List is introduced.

2) Interceptor's Operation:

FIG. 6 illustrates the interaction among Interceptor's four components. For clarity, the depicted six-step scenario is based on the example from Listings 1 and 2, but it is reflective of Interceptor's operation in general.

1) When M1 of MalApp1 tries to send intent i by calling startActivity( ), request is routed to ActivityManager.

2) ActivityManager extracts sender's (i.e., M1's) information and searches for components permitted to receive intent i. If a receiver is identified (i.e., V2 of VicApp1), ActivityManager passes the ICC information to Blocker.

3) After receiving information about the ICC, Blocker first examines ChoiceDatabase. If a choice for the ICC already exists, Blocker induces ActivityManager to act (block or route the ICC) without engaging the end-user.

4) In case no corresponding choice exists in ChoiceDatabase, Blocker scans the SEALANT List provided by ListProvider.

5) If the information about the requested ICC matches that in the SEALANT List, Blocker will give the user four options: (1) allow the ICC once, (2) block it once, (3) allow it always, and (4) block it always. If the user selects options (3) or (4), her choice will be stored in ChoiceDatabase.

6) If the end-user chooses to allow (resp. block) the requested ICC, Blocker will instruct ActivityManager to send intent i to V2 (resp. trap it).

3) Interceptor's Strategy for Blocking ICCs:

Interceptor is engaged between the times when an intent is first requested and when it is actually dispatched to its destination. Interceptor's operation may thus cause a delay in processing intents, which may be exacerbated by the number of vulnerable ICC paths in the SEALANT List. However, since Android's ICC is performed via asynchronous API calls, we hypothesize that this delay will not significantly impact the system's operation. In Section IV-C, we empirically evaluate Interceptor's performance overhead.

In case when an end-user has blocked a requested ICC, the apps that are involved in the ICC will not get any response to their request back from the framework. Since Android implements ICCs asynchronously, those apps will simply "skip" the corresponding operation without causing runtime crashes.

To block a vulnerable transitive ICC, Interceptor begins by matching the first path of the vulnerable transitive ICC path and setting its transitive_flag to true. This flag is managed per each vulnerable transitive ICC path and remains true as long as the subsequently requested ICCs match the subsequent paths in the vulnerable transitive path. Once the last path of the vulnerable transitive ICC path is reached, Interceptor alerts the end-user and resets transitive_flag to false. In the example from FIG. 5(C), let us assume that the vulnerable transitive ICC path M3 ! V8 ! V6 is in the SEALANT List. If M3 launches V8 via an intent, Interceptor will set transitive_flag to true. Then, if V8 launches V6 via an intent, Interceptor will alert the user and reset the flag.

III. Implementation

We have implemented SEALANT's Analyzer as a stand-alone Java application that receives as input a set of Android apps in APK files, and exports a SEALANT List in the pre-defined XML format. Analyzer's implementation combines approximately 3,000 newly written LOC with three off-the-shelf tools. The tools are used in the first of Analyzer's four phases (recall Section II-A). Analyzer integrates two static analysis tools, IC3 [29] and COVERT [7], to extract architectural objects from apps. We employed both tools because neither of them alone discovers all of the needed information: IC3 misses outbound intents in certain scenarios [29], while COVERT only returns coarse-grained intent information that excludes certain attributes (e.g., data type) [7]. Analyzer orchestrates the two tools together and combines their outputs in order to generate a more complete list of architectural objects. In identifying intra-component paths between ICC call methods and sensitive methods, Analyzer uses FlowDroid [27], a highly precise intra-component taint analysis tool for Android.

We implemented SEALANT's Interceptor on top of Android Open Source Project (AOSP) 4.4.4 KitKat [30], which is the most popular version of Android [31] today. We directly modified the source code of several standard Android components including ActivityManagerService, ActivityManagerNative, and IntentFirewall. In total, we introduced about 600 LOC spread over 10 classes. To minimize the impact on the original functionality of Android, we did not remove any standard components or methods. Our modification was limited to parts of Android that are usually a layer beneath manufacturers' customizations, and can easily be applied to Android versions 4.4 and later without significant changes. We were able to successfully run Interceptor's system image, both, on the Android emulator [32] and on a Google Nexus 7 device.

Since framework-level components in Android do not provide a user interface (UI), we also implemented an Android app that provides a UI to perform (1) pushing the SEALANT List from an external SD card to Interceptor's ListProvider, (2) removing the list from ListProvider, and (3) removing previous choices from Interceptor's Choice-Database.

Running SEALANT requires compiling Interceptor's source code with the provided drivers, and installing the image files using the freely available Android debug bridge [33] and Fastboot [34]. This cost can be minimized by bundling SEALANT with Android. SEALANT's code, required drivers, and compiled tools are available at http://softarch.usc.edu/sealant/.

IV. Evaluation

We evaluate SEALANT for effectiveness (Section IV-A), accuracy (IV-B), performance (IV-C), and usability (IV-D).

A. Effectiveness

To the best of our knowledge, two existing works share SEALANT's goal of providing protection of end-users from inter-app attacks: SEPAR [15] (previously named Droid-Guard [16]) and XmanDroid [3], [11]. SEPAR identifies vulnerable surfaces of a set of apps via static analysis and uses dynamic memory instrumentation that hooks the method calls of target apps at runtime. For example, in the scenario from FIG. 5(A), SEPAR would identify the vulnerability of V2 and hook the startActivity( ) method that sends an intent to V2. XmanDroid is a technique that only targets privilege escalation attacks by leveraging an extension to Android. XmanDroid enables a user to pre-define a list of ICC restriction policies, and automatically blocks ICCs that match any of those policies.

An ideal comparison of SEALANT against these two techniques would have included executing their implementations in a controlled setting and/or on a set of real-world Android apps. However, the implementation of XmanDroid we obtained from its authors only runs on a prior version of Android (2.2.1), while the current prototype implementation of SEPAR is missing certain features covered by the underlying technique (e.g., the policy enforcement module). In Section IV-B, we do evaluate SEALANT directly against one of the implemented features of SEPAR. We tried unsuccessfully to build an installation of XmanDroid on several recent versions of Android. Given the changes in Android since 2.2.1, continuing with this strategy proved impractical. For these reasons, we decided to analytically compare the three techniques, relying on the published algorithms of SEPAR [15] and XmanDroid [3], [11].

1) Comparison with SEPAR:

A detailed comparison of SEALANT and SEPAR using probabilistic random variables to capture their respective operations can be found at http://softarch.usc.edu/sealant/. Here we provide a summary of that analysis. SEALANT raises fewer false interapp attack alarms compared to SEPAR, because SEPAR does not support a finer-grained characterization of ICC paths (i.e., sender, receiver, and intent). For example, in the scenario depicted in FIG. 5(A), whenever an explicit intent is routed to V2, SEPAR would raise an alarm, even if the intent was sent from the component in the same app (i.e., V1).

2) Comparison with XmanDroid:

SEALANT suffers from fewer false negatives than Xman-Droid. The detection mechanism of XmanDroid requires a user to explicitly specify policies indicating the types of inter-app attacks she wishes to detect and ICC paths to monitor at runtime. This may omit critical interapp attacks. Recall the privilege escalation attack scenario from FIG. 5(C). When component M3 in MalApp3 requests an ICC to access V8 in VicApp4, XmanDroid inspects the permissions of MalApp3 and VicApp4 based on the pre-defined policies. Although a few general policies for XmanDroid have been proposed [11], they do not cover all vulnerability scenarios. In the above scenario, if a user-specified policy does not prohibit an ICC between an app with permission P1 and another app without it, XmanDroid will not raise an alarm. Since SEALANT inspects all ICC paths via static analysis to identify vulnerable paths, it does not suffer from this type of false negative.

SEALANT also suffers from fewer false positives than XmanDroid. XmanDroid finds ICCs that match policies specifying the sender and receiver permission combinations. However, this would also block safe ICCs initiated by a benign app with an identical set of permissions as a malicious app. Suppose that XmanDroid has a policy that would block ICCs between MalApp3 and VicApp4 in the scenario depicted in FIG. 5(C), and the device had another app, BenignApp, which is confirmed as reliable and holds identical permissions to MalApp3. In that case, even if BenignApp initiated an ICC to a method of VicApp4 that does not require P1, XmanDroid would block that ICC. SEALANT would not trigger such a false alarm.

exploits the vulnerable app. Without any intervention by the authors, the students built 41 distinct sets. This yielded 91 apps in total, of which 47 were new, while 42 were modified and 2 unmodified apps obtained from public sources [41], [42].

In total, this yielded 65 sets containing 135 apps, with 54 vulnerable ICC paths and 5 vulnerable transitive ICC paths. To ensure that inter-app attacks can be actually launched, we manually inspected the code of each set, and installed and ran the set on a Google Nexus 7. We confirmed that the attacks from the malicious apps were successfully launched and exploited the vulnerable apps by observing the apps' behavior via the device's UI and via logcat, a native Android tool for monitoring system debug outputs [43]. Our test suite also includes 12 "trick" apps containing vulnerable but unreachable components, whose identification would be a false warning. We divided this core test suite into three different groups, based on the type of attack to which a vulnerable app is exposed, as shown in Table II. Subsequently, we created an expanded test suite totaling 1,150 apps, by including another 1,015 apps randomly selected from Google Play [36] and MalGenome [38].

TABLE II

Applying SEALANT on the 135 Apps in the Core Test Suite

| Attack Type of Test Suit | Number of Apps | | | Vulnerable ICC Paths | | Identified ICC Paths (Precision/Recall) | | | Blocks ICC Paths (Precision/Recall) |
|---|---|---|---|---|---|---|---|---|---|
| | Vulnerable | Malicious | "Trick" | Direct | Transitive | SEPAR | IccTA | Analyzer | Interceptor |
| IS | 27 | 26 | 4 | 25 | 1 | 0.00/ 0.00 | 1.00/ 0.04 | 1.00/ 0.96 | 1.00/1.00 |
| UIR | 26 | 25 | 4 | 25 | 0 | 0.50/ 0.20 | 1.00/ 0.16 | 1.00/ 0.92 | 1.00/1.00 |
| PE | 8 | 11 | 4 | 4 | 4 | 0.00/ 0.00 | 0.00/ 0.00 | 1.00/ 1.00 | 1.00/1.00 |
| Total | 61 | 62 | 12 | 54 | 5 | 0.50/ 0.08 | 1.00/ 0.08 | 1.00/ 0.95 | 1.00/1.00 |

B. Applicability and Accuracy

We evaluated Analyzer's accuracy in identifying vulnerable ICC paths by comparing its results against those of SEPAR [15], [16] and IccTA [4], [35], state-of-the-art tools for ICC vulnerability detection [5], [6], [27]. We evaluated Interceptor's ability to block vulnerable ICC paths at runtime. We used a test suite of 1,150 Android apps in total.

1) Experimental Setup:

To build our test suite, we first selected several real-world apps that are vulnerable to inter-app attacks. Among the apps that were previously identified [15] from repositories such as Google Play [36], F-Droid [37], MalGenome [38], and Bazaar [39], we selected 13 that are exposed to the three types of attacks SEALANT targets. We also included six apps from DroidBench 2.0 [40], an app collection for benchmarking ICC-based data leaks. Since several of the 19 vulnerable apps did not have readily available malicious apps targeting them, we built 25 malicious apps, each of which performed one inter-app attack. To mitigate internal threats to the validity of our results, we also asked 39 graduate students at University of Southern California (USC) to build sets of apps that implement inter-app attacks based on published literature [2], [11]. Each of those sets was either a pair of apps forming a simple path, or a trio of apps forming a transitive path. Each set consisted of at least one vulnerable app and at least one malicious app that 2) Evaluation of Analyzer:

We evaluated SEALANT's Analyzer for accuracy in identifying vulnerable ICC paths as compared to SEPAR and IccTA. We used our core test suite to measure all three approaches' (1) precision, i.e., identified ICC paths that were actually vulnerable, and (2) recall, i.e., the ratio of identified to all vulnerable ICC paths. As depicted in Table II, Analyzer detected vulnerable ICC paths with 100% precision and 95% (56 of 59) recall. It was unable to correctly extract intent information in three cases due to the inaccuracies inherited from IC3 [29] and COVERT [7] (recall Section II). Analyzer correctly ignored all "trick" cases with unreachable vulnerable paths. SEPAR had 50% precision and 8% recall. This is primarily because SEPAR was designed (1) to identify vulnerable components or interfaces rather than specific ICC paths between them and (2) to return an ICC path only when both sender and receiver contain sensitive Android API methods [25], hampering its applicability in cases such as privilege escalation via a transitive ICC. IccTA had 100% precision and 8% recall. Since it targets a single type of attack (privacy leaks), IccTA also returned an ICC path only when it involved sensitive API methods [25]. Although SEALANT outperformed SEPAR and IccTA in our evaluation, it is important to note that SEPAR and IccTA support both intra- and inter-app analysis and may detect additional vulnerabilities that SEALANT does not.

We then used our expanded test suite of 1,150 apps (9,964 components, 20,787 ICC paths). We created 23 non-overlapping bundles, each comprising 50 apps randomly selected from the suite. We created 50-app bundles because this number is higher than the recently cited number of apps an average smartphone user regularly uses each month [44]. We ran all three tools on each bundle and manually checked if each identified ICC path is indeed vulnerable. Analyzer flagged 86 ICC paths, with 93% precision. The six false-positives were caused by IC3's inaccuracy in identifying intents and COVERT's omission of intent attributes in certain scenarios. SEPAR and IccTA were unable to analyze the bundles on four different hardware configurations. SEPAR's logs indicated that it was unable to generate flow-analysis results in some cases, while it did not return any vulnerabilities in other cases. IccTA invariably crashed; it was unable to analyze more than one app at a time in more than 75% of our attempts.

3) Evaluation of Interceptor: We evaluated Interceptor's accuracy in detecting and blocking malicious ICCs at runtime. To monitor all ICCs exchanged on a device, we integrated a logging module that outputs information of each ICC instance via logcat [43] into ActivityManager. We installed the 135 apps in our core test suite on a Google Nexus 7 with Interceptor set up, ran Analyzer on the device, and provided the resulting SEALANT List to Interceptor.

To run test scripts that trigger ICCs, we used monkeyrunner [45], an Android tool for running test suites. We designed each script to trigger one type of vulnerable ICC in the SEALANT List as well as various benign ICCs. We configured the scripts to choose to block an ICC when Interceptor prompts for a blocking choice. We repeated executing each script until we accumulated 30 blocked ICCs. At the end of each test script execution, we manually inspected the logs in order to measure (1) precision, i.e., if all blocked ICCs corresponded to vulnerable paths specified in the SEALANT List, and (2) recall, i.e., if Interceptor allowed any ICC attempts over the vulnerable paths. Interceptor was able to block vulnerable ICCs in the core test suite with perfect precision and recall (see Table II).

C. Performance

1) Evaluation of Analyzer:

To evaluate the performance of Analyzer, we used a PC with an Intel dual-core i5 2:7 GHz CPU and 4 GB of RAM. We divided our expanded test suite into four categories with different numbers of apps (25, 50, 75, and 100). For each category, we created ten different bundles randomly selected from the 1,150 apps, and ran Analyzer on each bundle. On average, extracting architectural information from each app took 77:95s and identifying vulnerable ICC paths took 1:08s per app. While the extraction is relatively time-consuming, in scenarios where an app is newly installed or updated, Analyzer reuses the previously extracted app models to minimize the execution time. It performs the extraction only on the new app, and then runs the vulnerable path identification over all apps.

Table III shows the average numbers of components and ICCs in each category. Since our approach manages an individual summary-based model of each app, the analysis time scales linearly with the number of apps.

TABLE III

Analyzer's Performance on Different Num. of Apps

| | Number of Apps | | | |
|---|---|---|---|---|
| | 25 | 50 | 75 | 100 |
| Avg. Number of Components | 237 | 553.5 | 761 | 1200 |
| Avg. Number of ICCs | 218 | 701.5 | 1110.5 | 1690.5 |
| Avg. Analysis Time (Sec.) | 22.17 | 42.24 | 107.27 | 118.43 |

2) Evaluation of Interceptor:

To evaluate Interceptor's impact on performance, we measured the differences in execution times between Android with Interceptor and without it (in the remainder of this section, referred to as "Interceptor" and "AOSP" [30], respectively). We configured the two environments to be highly similar and to reasonably reflect the real-world. We employed the Google Nexus 7 in both environments and configured both to use Android KitKat 4.4.4. We installed the 50 most popular third-party apps [46] on the devices.

To observe Interceptor's worst-case performance overhead, we manually created a SEALANT List that would induce the longest execution time. The list contained 10 paths (amounting to 20% of the installed apps), none of which matched the actual ICC paths between the 50 installed apps. This maximized the overhead of Interceptor's detection operation which sequentially matches an ICC to each path in its list. The above numbers were selected because they reflect (in fact, surpass) those found in the real-world: an average user regularly uses about 30 apps per month [44], and around 10% of Android apps are vulnerable to inter-app attacks [16]. To trigger a large number of ICCs on the test devices, we used Monkey [46], which generates pseudo-random streams of user- and system-level events on a target device. We used the same seed value in Interceptor and AOSP so that Monkey would generate identical event sequences in both environments. We injected 5,000 events in each environment and measured the time it took to process each event. We repeated this five times to mitigate the impact of conditions such as battery-status changes.

Table IV describes the results we obtained. The difference in mean execution times was less than 1 ms, and in maximum execution times under 40 ms. Differences of this degree are negligible because the threshold at which an end-user begins noticing slowdown in mobile app response is 100-200 ms [48]. Interceptor introduces low overhead because it simply extends an existing operation that AOSP already regularly performs to match a requested ICC with the list of paths on the device [30].

TABLE IV

Differences in Execution Times (in milliseconds)

| | Mean | Min | Max | Std Dev |
|---|---|---|---|---|
| Interceptor | 25.51 | 11.31 | 81.12 | 10.22 |
| AOSP | 25.20 | 10.09 | 45.85 | 7.18 |
| Difference | 0.31 | 1.22 | 35.27 | 3.04 |

D. Usability

When an intent exchange matches a vulnerable ICC path, SEALANT requires the end-user to either block or allow the exchange in order to secure her device. To assess how challenging such choices are for end-users, we conducted a user study and a survey, guided by two hypotheses:

H1: The intent-exchange control choices SEALANT requires an end-user to make are not more difficult than the choices required of end-users by "stock" Android.

H2: A non-expert user can make intent-exchange control choices that prevent an inter-app attack most of the time.

1) Experimental Setup:

Our user study and survey were designed to simulate situations in which users make choices reflective of daily Android use (e.g., whether to install an app after being shown the list of permissions it requires). Among those choices, we also inserted choices required by SEALANT. We asked the participants how difficult it was to make each choice and how confident they were in making the choice.

The study included 34 participants, all graduate students at USC, recruited via an e-mail list. The students' majors spanned engineering, communication, business, and social work. The background survey showed that the participants had used a mobile device for 59 months on average. 25 of the participants (74%) reported Android as their primary mobile platform or one they had experience using; 9 (26%) had not used Android previously. 5 participants (14%) were aged between 18 and 24, and the remaining 29 (86%) between 25 and 34.

We provided each user study participant a Google Nexus 7 with SEALANT pre-installed. They were presented with a series of 20 common scenarios of four different types:

Type 1—A dialog asks the user whether to install an app randomly selected from a credible source (Google Play [36]) given the list of permissions the app requires.

Type 2—Same as Type 1, but with apps randomly selected from an unreliable source.

Type 3—Intent matches multiple filters. Android displays a dialog so the user can choose which app to use.

Type 4—A dialog prompts the end-user to make a choice to block or allow a vulnerable inter-app access.

We used native-Android dialogs in 12 of the 20 scenarios (Type 1-3), and in the remaining 8, we used SEALANT's customized dialog (Type 4) that presents (1) the sender/receiver apps' names, (2) the identified attack type, and (3) block, allow, and always buttons among which the end-user must choose. Half of the apps used in Type 4 scenarios were selected from apps used in Type 1 and the other half from Type 2 scenarios.

During the study, we logged every interaction between a participant and the device via logcat [43]. At the end of each scenario, we asked participants to assess the scenario's difficulty and confidence in their choices, using a 7-point Likert scale.

In order to expand our dataset, we designed the online survey in the same manner as the user study. We took screenshots of what a user would see on her device as she went through the 20 scenarios, presented the screenshots to the survey respondents, and prompted them to make the corresponding choices.

We sent out 200 survey requests and received 155 valid responses (78%); 45 people did not respond or only partially completed the survey. We sent requests to known e-mail lists and contacts, and allowed them to self-select. The respondents had used a mobile device for 51 months on average. 138 (89%) named Android as their primary mobile platform or had experience using it. The survey covered a range of age groups and occupations. 11 respondents (7%) were aged 18-24, 46 (30%) were 25-34, 37 (24%) were 35-44, 35 (22%) were 45-54, and 26 (17%) were 55+. Respondents included 46 students (30%), 27 medical doctors (17%), 20 business people (13%), 11 housewives (7%), 10 software engineers (7%), 9 professors (6%), 5 retailers (3%), 5 lawyers (3%), and 22 others (14%).

More detailed information about the user study and survey is available at http://softarch.usc.edu/sealant/.

2) Results:

We evaluate hypotheses H1 and H2 using the user study and survey data. For simplicity, we refer to the user study participants and survey respondents as "participants".

H1—

We compared (1) the difficulty perceived by participants in making their choices, (2) the confidence participants had in their choices, and (3) the time it took to make choices for native-Android dialogs (Type 1-3) and SEALANT dialogs (Type 4). Table V presents the data we obtained. A comparison of the mean degrees of difficulty showed that they did not differ significantly between the two groups of scenarios (Student's t-test; p-value 0.928 for user study and 0.972 for survey). A comparison of the mean degrees of confidence yielded the same conclusion (Student's t-test; p-value 0.853 for user study and 0.646 for survey). Finally, the median response time was significantly lower for Type 4 than for Type 1-3 scenarios (the Mann-Whitney-Wilcoxon test; p-value 0.000). These results support the conclusion that SEALANT's intent-exchange control choices are not more difficult than those of stock Android.

TABLE V

Difficulty, Confidence, and Response Time per Dialog Type

| Dialog Type | User study | | | | | | | | | Survey | | | | | |
| --- | --- | --- | --- | --- | --- | --- | --- | --- | --- | --- | --- | --- | --- | --- | --- |
| | Difficulty | | | Confidence | | | Response Time | | | | Difficulty | | | Confidence | | |
| | n | $\bar{x}$ | s | n | $\bar{x}$ | s | n | $\bar{x}$ | M | s | n | $\bar{x}$ | s | n | $\bar{x}$ | s |
| Type 1 | 34 | 5.26 | 1.62 | 34 | 5.65 | 0.95 | 34 | 6.99 | 4.06 | 8.29 | 155 | 4.14 | 1.29 | 155 | 4.16 | 1.30 |
| Type 2 | 34 | 4.68 | 1.70 | 34 | 5.35 | 1.20 | 34 | 12.32 | 9.92 | 7.92 | 155 | 4.29 | 1.25 | 155 | 4.15 | 1.33 |
| Type 3 | 34 | 4.79 | 1.68 | 34 | 5.56 | 1.02 | 34 | 9.02 | 6.51 | 8.58 | 155 | 4.65 | 1.38 | 155 | 4.35 | 1.36 |
| Type 4 | 34 | 4.97 | 140 | 34 | 5.50 | 1.21 | 34 | 6.24 | 5.10 | 4.32 | 155 | 4.35 | 1.33 | 155 | 4.17 | 1.26 |
| Type 1-3 | 102 | 4.91 | 1.67 | 102 | 5.52 | 1.06 | 102 | 9.44 | 7.24 | 8.53 | 465 | 4.36 | 1.32 | 465 | 4.22 | 1.33 |

H2—

We measured the proportion of instances in which a participant elected to block an intent exchange and prevent an attack in a Type 4 scenario. In general, users may deliberately allow vulnerable intent exchanges (e.g., a user trusts both apps). However, in our study, unbeknownst to the users, we only included paths actually leading to exploits, allowing us to know the correct behavior. Recall that one half of the apps in the Type 4 scenarios came from reliable and the other half from unreliable sources. In the combined Type 1 (credible apps) and Type 2 (unreliable apps) scenarios, participants chose to cancel installation 51% of the time. That tendency, halting an on-going activity to avoid security threats, was much higher for Type 4 scenarios. The 34 user study participants chose intent blocking 70% of the time, while 155 survey participants chose blocking 68% of the time. Participants were thus able to make intent-exchange choices that did not lead to inter-app attacks at a much higher rate than their "average" behavior.

E. Threats to Validity

Our user study participants were students. To address any resulting bias, we additionally conducted the survey whose respondents spanned a variety of ages and occupations. The survey merely emulated a mobile environment, possibly influencing the participants' choices. As a mitigation, we carefully described each scenario to provide the participants with the context they would have had if they had used an actual device. We also separately analyzed the user study and survey results, and both support our conclusions. Lastly, the participants elected to allow a fair portion (30%) of the vulnerable ICCs in cases we designed blocking to be the appropriate choice. While we consider the users' choices to block the rest 70% of ICCs that would otherwise have remained uncaught without SEALANT as a positive result, this indicates that improvements may be possible with regards to how SEALANT presents the vulnerable ICCs to end-users.

V. Concluding Remarks

SEALANT is an integrated technique that monitors and protects ICC paths through which Android inter-app attacks can take place. SEALANT's combination of static and dynamic analysis improves upon existing techniques in automatically identifying the vulnerable ICC paths between a set of apps, monitoring each instance of ICC to detect potential attacks, and empowering end-users to stop the attacks. Our evaluation demonstrates SEALANT's effectiveness, efficiency, accuracy, scalability, and usability. Notably, we have shown that SEALANT outperforms existing alternatives in blocking interapp attacks and can be applied in real-world scenarios, with a negligible performance overhead and a minor adoption barrier.

Several avenues of future work remain. Analyzer shares two limitations of static-analysis tools it leverages (i.e., IC3, COVERT, and FlowDroid). First, reflective calls are resolved only when their arguments are string constants. To this end, we will explore reflection analysis techniques [49]. Second, incomplete models of native methods and dynamically loaded code can cause unsoundness in our results. This can be remedied by leveraging additional sources of vulnerabilities [50] and dynamic analysis techniques [51], [52]. Inter-app attacks can also be launched via covert channels in the Android core system components and via kernel-controlled channels (e.g., confused deputy attacks over a local socket connection or collusion attacks over the file system). We can counter such attacks by combining our solution with kernel-level solutions (e.g., SELinux [53] and FlaskDroid [10]). Another direction for our work is to feed end-users' choices into a statistical model, to provide more specific guidance. Eventually, we can incorporate these techniques in designing applications [54], [55].

2. A Sealant System Having Detection and Visualization Tool for Inter-App Security Vulnerabilities in Android

I. SEALANT'S DESIGN AND IMPLEMENTATION

As set forth above, SEALANT is a tool that automatically identifies ICC paths in a set of target apps that are vulnerable to inter-app attacks, and visualizes the identified paths using the architectural information of those target apps. SEALANT processes a set of APK1 files as input and displays the output in a pre-defined representation.

As shown in FIG. 3, SEALANT is designed to have two layers. (1) SEALANT's front-end is responsible for providing the interactive user interface. The SEALANT Client component belongs to this layer. (2) SEALANT's back-end is responsible for identifying vulnerable ICC paths from target apps, managing the extracted information, and transforming the information into a visually representable format. The back-end comprises three main components: SEALANT Core, SEALANT Analyzer, and SEALANT Repository. In the rest of this section, we will describe the details of SEALANT's four components and their implementations.

A. SEALANT Client

SEALANT Client facilitates a user's interaction with the back-end layer. Once the user selects a set of APK files that were automatically pulled from the user's device [56] or manually downloaded from online app stores, the SEALANT Client forwards the files to the SEALANT Core and informs APK (Android Package Kit) is an archive file format that distributes and installs Android apps on top of the Android operating system. the user of the analysis status (e.g., displaying the analysis progress).

The SEALANT Client renders the combined information obtained from the SEALANT Core (i.e., app models and identified vulnerable ICC paths) in tailorable visual notations. For example, a component may be depicted as a black dot and a vulnerable path as a line, as shown in FIG. 4(A). The SEALANT Client provides interactive interfaces that enable users to customize display settings (e.g., size, font, and color) or highlight particular architectural elements (e.g., component or ICC path).

The SEALANT Client optionally contacts users to assess each vulnerable ICC path. Since SEALANT's static analysis may over-approximate control-flow paths [57], which in turn may result in spurious vulnerable ICC paths in some cases, a user's assessment can reduce the falsely identified paths in subsequent analyses. Furthermore, referring to an expert user's assessments may aid non-expert users to isolate the falsely identified paths.

B. SEALANT Core

SEALANT Core is responsible for controlling every operation and transforming the analyzed information into a visually representable format. It handles every request from SEALANT Client. If a set of APK files is requested, the Core component first checks if prior analysis results are stored in the SEALANT Repository. If the corresponding results exist, the Core reuses them. Otherwise, it decompiles the APK files and passes them to the SEALANT Analyzer. The Core subsequently combines and transforms the app models and vulnerable ICC paths it receives back from the Analyzer into a pre-defined format compatible with the SEALANT Client. The Core stores the user's assessments received from the SEALANT Client in the SEALANT Repository.

C. SEALANT Analyzer

Given a set of apps, SEALANT Analyzer extracts each app's architectural information and summarizes the information as a model of each app. The Analyzer identifies vulnerable ICC paths between the apps using data-flow analysis and ICC pattern matching. It consists of two sub-components: Model Extractor and Vulnerability Identifier.

Model Extractor inspects each app's Android manifest file and bytecode to extract the app's architectural information (e.g., components, intent filters, permissions, and intents).

For each app component, Model Extractor performs data-flow analysis between sensitive APIs [25] and ICC-call APIs [24]. A component that contains such a data-flow is marked as a vulnerable component. Model Extractor then builds a summary based model that captures the information of each app, and stores every model in the SEALANT Repository for reuse in subsequent analyses.

Vulnerability Identifier analyzes vulnerable ICC paths from a set of app models. To this end, it first builds an ICC graph by matching intents and intent filters of each component based on the rules from Android's API reference documentation [28].

In an ICC graph, a node represents a component and an edge is defined as a tuple <s, r, i>, where s is a sender and r a receiver component, and i is an intent between them. SEALANT then traverses the ICC graph and marks an edge as vulnerable based on two criteria: (1) if there is a vulnerable component at one or both ends and (2) if it is a part of a particular compositional ICC patterns that may be vulnerable to inter-app attacks. Specifically, two different edges (one across apps and the other one within an app) that direct to the same component with the same type of intent represent a vulnerable ICC pattern susceptible to intent spoofing. Conversely, two different edges (one across apps and the other one within an app) that start from the same component with the same type of intent represent a vulnerable ICC pattern susceptible to unauthorized intent receipt. The identified vulnerable ICC paths are stored in the SEALANT Repository for reuse in subsequent analyses.

D. SEALANT Repository

SEALANT Repository maintains the extracted app models in its Model Database sub-component and the identified vulnerable ICC paths in the Path Database sub-component.

Model Database manages each app's model by its package name and versions in order to enable reusing the extracted information for further analyses. When apps are installed or updated on a user's device subsequent to running SEALANT, SEALANT extracts the architectural information only from the installed or updated apps, and reuses the prior analysis results for the rest. This can greatly reduce the total analysis time (as evaluated in Section III).

Path Database maintains the identified vulnerable ICC paths. For each vulnerable ICC path, it also maintains each user's assessment that indicates whether the ICC path is indeed exposed to inter-app attacks or not.

E. Implementation

We have implemented the SEALANT Analyzer as a standalone Java application that uses a set of APK files as its input. It combines approximately 3,000 newly written LOC with off-the-shelf tools. Specifically, to enable a complete extraction of architectural information from apps, the Analyzer integrates two static analysis tools: IC3 [29] and COVERT [7]. To perform data-flow analysis on each component, the Analyzer leverages FlowDroid [27], an intra-component taint analysis tool for Android. The Analyzer combines the outputs from those tools into complete app models. The app models for architectural objects and identified vulnerable ICC paths are, respectively, transformed into two different JSON files with pre-defined formats. The JSON file for vulnerable ICC paths is also compatible with Interceptor [57], an extension module we have developed for the Android framework to control runtime ICCs based on a given list of ICC paths.

We implemented the SEALANT Core using Java and shell script code that integrates different components, totaling around 3,600 LOC.

We implemented the SEALANT Repository as a file system based repository. It maintains three different types of files: (1) app models, (2) vulnerable ICC paths, and (3) assessments of each vulnerable ICC path.

Finally, we implemented the SEALANT Client as a web application, using HTML5 with the off-the-shelf JavaScript libraries that include jQuery [58] for event handling web pages, Bootstrap [59] for developing a responsive web application, and D3 [60] for a data-driven visualization. The size of the SEALANT Client is approximately 4,500 LOC. We extended the display notation for the SEALANT Client by specifying a meta-model in D3. The notation includes the essential elements representing Android app architectures (i.e., components, apps, and ICC paths).

II. KEY TOOL FEATURES

SEALANT's key features are intended to automatically identify ICC vulnerabilities among a given set of apps and effectively deliver the identified information to users. The features also enable users to assess each identified vulnerable ICC path, selectively focus on particular architectural elements (e.g., paths, components, or apps), and reuse prior analysis results. The features that can be accessed via the SEALANT Client are shown in FIG. 4.

Automated Detection of Vulnerabilities.

Given a set of APK files or app models from prior analyses, SEALANT automatically processes the detection of inter-app vulnerabilities. The entire detection process takes place in the backend. During the process, progress bars display the status of each analysis step (i.e., extraction of architectural information and identification of vulnerable ICC paths). Once the analysis is completed, SEALANT provides options for exporting the identified vulnerabilities in a textual format or visualizing them in pre-defined notations.

Visualization of Architecture and Vulnerabilities.

To effectively visualize a number of components in Android apps, SEALANT displays the integrated and compositional view of target apps as shown in FIG. 4(A). SEALANT depicts each component as a labeled dot, each app as a cluster of components, and each ICC path between a pair of components as a gray line connecting the respective dots. The vulnerable ICC paths are presented as colored lines, with different colors for each vulnerability type: intent spoofing is red (dotted line in FIG. 4A), unauthorized intent receipt is blue (dashed line in FIG. 4A), and privilege escalation is green (dash dot dot line in FIG. 4A). A user can customize display options such as font size, display size, and line tension. As part of the visualization feature, if a user hovers the pointer over an app or a component name, SEALANT shows its detailed information, such as type, intent filters, and permissions. As shown in FIG. 4(B), SEALANT also presents detailed information for each vulnerable ICC path, and a user can assess whether a given path is indeed unsafe or not. The user assessments can provide a reference point for future analyses, as detailed below.

Selective Visualization.

For a set of apps that contain a large number of components and ICC paths, displaying all the components and paths may be incomprehensible to users. To handle this, SEALANT provides a selective visualization that allows a user to focus on a particular set of apps, components, or vulnerabilities. For example, if a user clicks on a desired component's name, SEALANT highlights the ICC paths (and the corresponding components) that are connected to it, and fades out the other parts. SEALANT also enables users to choose different visualization types that use different notations and topologies.

Reuse of Prior Analyses.

When apps are installed or updated, rerunning the SEALANT Analyzer is required to identify vulnerable paths in the new ICC graph. To effectively handle this, SEALANT supports reusing prior analysis results by maintaining the models for apps and vulnerable ICC paths, respectively. Whenever the analysis is requested, SEALANT automatically checks if the same apps' models or corresponding vulnerable ICC path information exist in its Repository. Consequently, the analysis time will primarily depend on the number of newly analyzed apps.

III. EVALUATION

In this section, we evaluate SEALANT's accuracy, scalability, performance, and usability.

Accuracy.

Our prior research [57] and section 1 set forth above evaluate the accuracy of SEALANT in terms of detecting vulnerable ICC paths from real-world apps. Specifically, we created a test suite comprising the apps from existing benchmarks and externally developed apps [15], [40] (in total, 135 apps with 59 vulnerable ICC paths). From the test suite, SEALANT detected vulnerable ICC paths with 100% precision (precision is the ratio of vulnerable ICC paths to identified ICC paths) and 95% recall (recall is the the ratio of identified to all vulnerable ICC paths), both of which are higher than those of existing tools (SEPAR [15]: 50% and 8%, respectively; IccTA [6]: 100% and 8%, respectively).

Scalability.

To evaluate SEALANT's scalability, we extended the above test suite by randomly including apps from public sources [36], [38]. The selected 1,150 apps were divided into 23 non-overlapping bundles comprising 50 apps each. These bundles are larger than the number of apps an average Android user is shown to regularly use each month [61]. From the bundles, SEALANT flagged 86 ICC paths with 93% precision. The results demonstrated that SEALANT successfully works on representative sets of real-world apps with improved scalability as compared to existing tools.

Performance.

Figure 7:
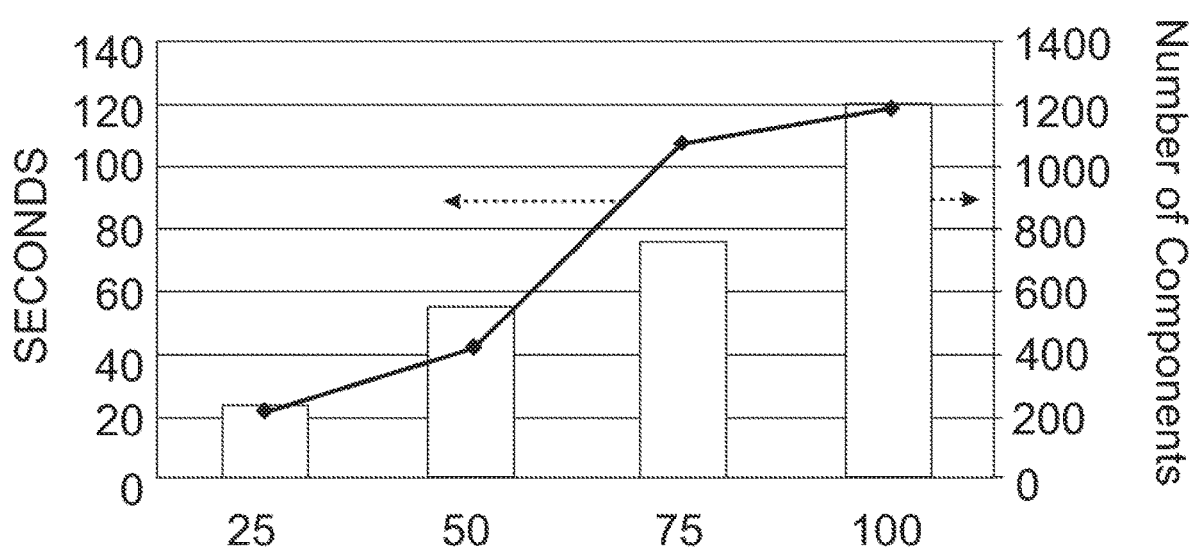
FIG. 7: SEALANT's Performance on Different Numbers of Apps and Components

We evaluated SEALANT's performance in detecting vulnerable ICC paths [57]. From the extended test suite used above, we randomly selected four categories of ten different bundles of apps. A category comprised 25, 50, 75, or 100 apps. As shown in FIG. 7, since SEALANT maintains a summary-based model of each app, as expected the analysis time scaled linearly with the number of apps and components. On average, extracting architectural information from each app took 77.95 s and identifying vulnerable ICC paths took 1.08 s per app. Although the extraction is relatively time-consuming, SEALANT's feature for reusing prior analysis can reduce up to 98.63% of the analysis time in subsequent analyses.

Usability.

To confirm that SEALANT's visualization helps the users' understanding of inter-app vulnerabilities, we conducted a user study. Our participants included 30 computer science graduate students at the University of Southern California, recruited via an e-mail list. The background survey indicated that 25 of the participants (83.33%) used Android as their primary mobile platform while the remaining 5 (16.67%) had prior experience using it. The analysis results of vulnerable ICC paths (of ten Android apps that form five inter-app vulnerabilities) were given to each participant via two different representation methods: a textual list and SEALANT's visualization. Participants were asked to evaluate the level of difficulty in understanding vulnerabilities for each method, using a 7-point Likert scale (1=very difficult, 7=very easy). We also asked them about the factors that affected their evaluation. According to the responses, the mean degrees of SEALANT's visualization (Mean=5.43, Std.=1.66) was higher than that of textual representation (Mean=2.82, Std.=1.60). The factors that affect their preference for SEALANT's visualization were intuitiveness (54.55%), ease of understanding (31.82%), compositional view (9.09%), and others (4.54%). The results support the conclusion that SEALANT's visualization successfully aids a user's understanding of inter-app vulnerabilities.

IV. CONCLUSION

Our experimental results of applying SEALANT to hundreds of real-world Android apps have demonstrated that it accurately identifies vulnerable ICC paths. Our user study also has shown that it successfully aids users in understanding the identified vulnerabilities. We plan to extend SEALANT to support other types of inter-app attacks that exploit covert channels in the Android core system components, such as the file system. Another potential direction for future work is evaluating different types of displays (e.g., different notations and colors) to find the most efficient way of delivering Android inter-app vulnerabilities.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

REFERENCES

[1] "2012 Norton Cybercrime Report," http://www.norton.com/2012cybercrimereport, Symantec Corporation, 2012.

[2] E. Chin, A. P. Felt, K. Greenwood, and D. Wagner, "Analyzing Inter-Application Communication in Android," in Proceedings of the 9th International Conference on Mobile Systems, Applications, and Services.

[3] S. Bugiel, L. Davi, A. Dmitrienko, T. Fischer, and A.-R. Sadeghi, "XManDroid: A New Android Evolution to Mitigate Privilege Escalation Attacks," Technische Universitat Darmstadt, Tech. Rep. TR-2011-04, 2011.

[4] L. Li, A. Bartel, T. F. Bissyandé, J. Klein, Y. Le Traon, S. Arzt, S. Rasthofer, E. Bodden, D. Octeau, and P. Mcdaniel, "IccTA: Detecting Inter-Component Privacy Leaks in Android App," in Proceedings of the 37th International Conference on Software Engineering, 2015.

[5] W. Klieber, L. Flynn, A. Bhosale, L. Jia, and L. Bauer, "Android Taint Flow Analysis for App Sets," in Proceedings of the 3rd International Workshop on the State of the Art in Java Program Analysis, 2014.

[6] F. Wei, S. Roy, X. Ou, and Robby, "Amandroid: A Precise and General Inter-component Data Flow Analysis Framework for Security Vetting of Android Apps," in Proceedings of the ACM SIGSAC Conference on Computer and Communications Security, 2014.

[7] H. Bagheri, A. Sadeghi, J. Garcia, and S. Malek, "COVERT: Compositional Analysis of Android Inter-App Permission Leakage," IEEE Transactions on Software Engineering, vol. 41, no. 9, pp. 866-886, 2015.

[8] S. Rasthofer, S. Arzt, E. Lovat, and E. Bodden, "DroidForce: Enforcing Complex, Data-centric, System-wide Policies in Android," in Proceedings of the 9th International Conference on Availability, Reliability, and Security (ARES), 2014.

[9] M. Ongtang, S. McLaughlin, W. Enck, and P. McDaniel, "Semantically Rich Application-Centric Security in Android," in Proceedings of the Annual Computer Security Applications Conference (ACSAC), 2009.

[10] S. Bugiel, S. Heuser, and A.-R. Sadeghi, "Flexible and Fine-Grained Mandatory Access Control on Android for Diverse Security and Privacy Policies," in Proceedings of the 22nd USENIX Conference on Security.

[11] S. Bugiel, L. Davi, R. Dmitrienko, and T. Fischer, "Towards Taming Privilege-Escalation Attacks on Android," in NDSS, 2012.

[12] L. Lu, Z. Li, Z. Wu, W. Lee, and G. Jiang, "Chex: Statically Vetting Android Apps for Component Hijacking Vulnerabilities," in Proceedings of the Conference on Computer and Communications Security, 2012.

[13] M. Dietz, S. Shekhar, D. S. Wallach, Y. Pisetsky, and A. Shu, "QUIRE: Lightweight Provenance for Smart Phone Operating Systems," in Proceedings of the 20th USENIX Conference on Security, 2011.

[14] D. Octeau, P. McDaniel, S. Jha, A. Bartel, E. Bodden, J. Klein, and Y. Le Traon, "Effective Inter-component Communication Mapping in Android with Epicc: An Essential Step Towards Holistic Security Analysis," in Proceedings of the 22nd USENIX Conference on Security.

[15] H. Bagheri, A. Sadeghi, R. Jabbarvand, and S. Malek, "Practical, Formal Synthesis and Automatic Enforcement of Security Policies for Android," in Proceedings of the 46th IEEE/IFIP International Conference on Dependable Systems and Networks (DSN), 2016.

[16] H. Bagheri, A. Sadeghi, R. Jabbarvand, and S. Malek, "Automated Dynamic Enforcement of Synthesized Security Policies in Android," George Mason University, Tech. Rep. GMU-CS-TR-2015-5, 2015.

[17] A. Belokosztolszki, D. M. Eyers, P. R. Pietzuch, J. Bacon, and K. Moody, "Role-Based Access Control for Publish/Subscribe Middleware Architectures," in Proceedings of the 2nd International Workshop on Distributed Event-Based Systems (DEBS), 2003.

[18] B. Shand, P. Pietzuch, I. Papagiannis, K. Moody, M. Migliavacca, D. M. Eyers, and J. Bacon, Reasoning in Event-Based Distributed Systems, 2011, ch. Security Policy and Information Sharing in Distributed Event-Based Systems.

[19] L. I. W. Pesonen, D. M. Eyers, and J. Bacon, "Encryption-Enforced Access Control in Dynamic Multi-Domain Publish/Subscribe Networks," in Proceedings of the Inaugural International Conference on Distributed Event-based Systems (DEBS), 2007.

[20] M. Srivatsa, L. Liu, and A. Iyengar, "EventGuard: A System Architecture for Securing Publish-Subscribe Networks," ACM Transactions on Computer Systems (TOCS), vol. 29, no. 4, pp. 10:1-10:40, 2011.

[21] L. Fiege, M. Mezini, G. Muhl, and A. P. Buchmann, "Engineering Event-Based Systems with Scopes," in Proceedings of the 16th European Conference on Object-Oriented Programming (ECOOP), 2002.

[22] S. J. Templeton and K. E. Levitt, "Detecting Spoofed Packets," in DARPA Information Survivability Conference and Exposition Proceedings, 2003.

[24] "android.app Android Developers." [Online]. Available: http://developer.android.com/reference/android/app/package-summary.html

[25] S. Rasthofer, S. Arzt, and E. Bodden, "A Machine-Learning Approach for Classifying and Categorizing Android Sources and Sinks," in NDSS, 2014.

[26] K. W. Y. Au, Y. F. Zhou, Z. Huang, and D. Lie, "PScout: Analyzing the Android Permission Specification," in Proceedings of the 19th ACM Conference on Computer and Communications Security (CCS), 2012.

[27] S. Arzt, S. Rasthofer, C. Fritz, E. Bodden, A. Bartel, J. Klein, Y. Le Traon, D. Octeau, and P. McDaniel, "Flowdroid: Precise Context, Flow, Field, Object-Sensitive and Lifecycle-Aware Taint Analysis for Android Apps," in Proceedings of the 35th annual ACM SIGPLAN conference on Programming Language Design and Implementation (PLDI), 2014.

[28] "Intents and Intent Filters Android Developers." [Online]. Available: https://developer, android. com/guide/components/intents-filters. html

[29] D. Octeau, D. Luchaup, M. Dering, S. Jha, and P. McDaniel, "Composite Constant Propagation: Application to Android Inter-Component Communication Analysis," in Proceedings of the 37th International Conference on Software Engineering (ICSE), 2015.

[30] "Android Open Source Project," https://source.android.com, 2016.

[31] "Dashboards Android Developers," https://developer.android.com/about/dashboards, 2016.

[32] "Run Apps on the Android Emulator Android Studio," https://developer. android.com/studio/run/emulator.html, 2016.

[33] "Android Debug Bridge," http://developer.android.com/tools/help/adb.html, 2016.

[34] "Running Builds—Booting into Fastboot Mode." [Online]. Available: https://source.android.com/source/running.html#booting-into-fastboot-mode

[35] "IccTA," http://sites.google.com/site/icctawebpage, 2016.

[36] "Google Play," http://play.google.com/store/apps, Google, 2015.

[37] "F-Droid—and Open Source Android App Repository," https://f-droid.org, 2016.

[38] Y. Zhou and X. Jiang, "Dissecting Android Malware: Characterization and Evolution," in Proceedings of the 33rd IEEE Symposium on Security and Privacy (SP), 2012.

[39] "Bazaar," http://cafebazaar.ir, 2016.

[40] "DroidBench: A micro-benchmark suite to assess the stability of taint-analysis tools for Android," https://github.com/secure-softwareengineering/DroidBench, 2015.

[41] "apps-for-android—Google Code Archive," https://code.google.com/archive/p/apps-for-android/, 2016.

[42] "Sourcecodester.com," http://www.sourcecodester.com/android, 2016.

[43] "logcat Command-line Tool Android Studio," https://developer.android. com/studio/command-line/logcat.html, 2015.

[44] "So Many Apps, So Much Time For Entertainment," http://www.nielsen.com/us/en/insights/news/2015/so-many-appsso-much-more-time-for-entertainment.html, 2015.

[45] "monkeyrunner|Android Studio," https://developer.android.com/studio/test/monkeyrunner, 2016.
[46] "Download APK Android Apps and Games," http://www.appsapk.com, 2016.
[47] "UI/Application Exerciser Monkey|Android Studio," http://developer.android.com/tools/help/monkey.html, 2016.
[48] "Keeping Your App Responsive|Android Developers," http://developer.android.com/training/articles/perf-anr.html, 2016.
[49] L. Li, T. F. Bissyandé, D. Octeau, and J. Klein, "DroidRA: Taming Reflection to Support Whole-Program Analysis of Android Apps," in Proceedings of the 25th International Symposium on Software Testing and Analysis (ISSTA), 2016.
[50] Y. Zhou, Z. Wang, W. Zhou, and X. Jiang, "Hey, You, Get Off of My Market: Detecting Malicious Apps in Official and Alternative Android Markets," in NDSS, 2012.
[51] W. Enck, P. Gilbert, B.-G. Chun, L. P. Cox, J. Jung, P. McDaniel, and A. N. Sheth, "TaintDroid: An Information-flow Tracking System for Realtime Privacy Monitoring on Smartphones," in Proceedings of the 9th USENIX Conference on Operating Systems Design and Implementation.
[52] Y. K. Lee, J. Bang, J. Garcia, and N. Medvidovic, "ViVA: A Visualization and Analysis Tool for Distributed Event-based Systems," in Proceedings of the 36th International Conference on Software Engineering, 2014.
[53] A. Shabtai, Y. Fledel, and Y. Elovici, "Securing Android-Powered Mobile Devices Using SELinux," IEEE Security & Privacy, vol. 8, no. 3, 2010.
[54] A. Shahbazian, G. Edwards, and N. Medvidovic, "An End-to-End Domain Specific Modeling and Analysis Platform," in Proceedings of the 8th International Workshop on Modeling in Software Engineering, 2016.
[55] M. Langhammer, A. Shahbazian, N. Medvidovic, and R. H. Reussner, "Automated Extraction of Rich Software Models from Limited System Information," in Proceedings of the 13th Working IEEE/IFIP Conference on Software Architecture (WICSA), 2016.
[56] "Apk Extractor." [Online]. Available: https://play.google.com/store/apps/details?id=com.extui&h1=en/
[57] Y. K. Lee, J. y. Bang, G. Safi, A. Shahbazian, Y. Zhao, and N. Medvidovic, "A SEALANT for Inter-app Security Holes in Android," in Proceedings of the 39th International Conference on Software Engineering, 2017.
[58] "jQuery." [Online]. Available: https://jquery.com/
[59] "Bootstrap." [Online]. Available: http://getbootstrap.com/
[60] "D3.js—Data-Driven Documents." [Online]. Available: https://d3js.org/
[61] "So Many Apps, So Much Time For Entertainment." [Online]. Available: http://www.nielsen.com/us/en/insights/news/2015/so-manyapps-so-much-more-time-for-entertainment.html

What is claimed is:

1. A system for providing increased security in a mobile operating system on a mobile device, the system comprising:
a mobile device comprising a mobile processor, an input component, and an output component, the mobile device executing a mobile operating system, where a remote computing device or the mobile device is operable to receive or identify two or more applications that are currently installed or intended to be installed on the mobile operating system, the remote computing device or the mobile device is operable to identify vulnerable inter-component communication (ICC) paths between components of the two or more applications installed on the mobile operating system by analyzing files associated with each of the two or more applications,
wherein a list of the vulnerable ICC paths is stored in memory of the mobile device; and
wherein the mobile processor compares the list of the vulnerable ICC paths to intents sent by the components of the two or more applications and identifies a potential unsecure intent that matches one of the list of the vulnerable ICC paths, the output component outputting output data requesting confirmation that the potential unsecure intent is authorized, the input component receiving user input confirming or denying authorization of the potential unsecure intent such that the mobile processor blocks the potential unsecure intent when the user input denies the authorization of the potential unsecure intent wherein the user input includes a selection of one of a single time authorization of the potential unsecure intent, a single time denial of the authorization, a permanent authorization of the potential unsecure intent, or a permanent denial of the authorization.

2. The system of claim 1 wherein a choice database including previous potential unsecure intents and whether each of the previous potential unsecure intents corresponds to the permanent authorization of the potential unsecure intent or the permanent denial of the authorization is stored in memory, the mobile processor being operable to identify that a new intent matches an entry in the choice database and blocking the new intent when the entry corresponds to the permanent denial of the authorization.

3. The system of claim 2 wherein the mobile processor is further operable to allow the output component to output the output data when the entry corresponds to the permanent authorization of the potential unsecure intent.

4. The system of claim 1 wherein vulnerable ICC paths are identified by identifying a path that is vulnerable to at least one of intent spoofing, unauthorized intent receipt, or privilege escalation.

5. The system of claim 1 wherein the remote computing device or the mobile device is further operable to identify that a new application has been installed on the mobile operating system, to identify additional vulnerable ICC paths between new components of the new application and the components of the two or more applications; and to store the additional vulnerable ICC paths in memory of the remote computing device or in memory of the mobile device.

6. The system of claim 1 wherein a vulnerable ICC path is defined as a path between a component of one of the two or more applications and a sensitive method.

7. The system of claim 1 wherein the mobile operating system includes a module that manages routing of intents among components of the two or more applications.

8. The system of claim 7 wherein the remote computing device or the mobile device is operable to identify the vulnerable ICC paths by analyzing files packaged according to mobile app container formats.

9. The system of claim 7 wherein the remote computing device or the mobile device is operable to visualize potential ICC paths and vulnerable ICC paths.

10. A method for providing increased security in a mobile operating system on a mobile device, the method comprising:
receiving or identifying, by a remote processor that is remote from the mobile device or by the mobile device, two or more applications that are currently installed or intended to be installed on the mobile operating system;

identifying, by the remote processor or by the mobile device, vulnerable inter-component communication (ICC) paths between components of the two or more applications installed on the mobile operating system by analyzing files associated with each of the two or more applications;

storing, in a memory of the mobile device, a list of the vulnerable ICC paths;

comparing, by a mobile processor of the mobile device, the list of the vulnerable ICC paths to intents sent by the components of the two or more applications;

identifying, by the mobile processor, a potential unsecure intent that matches one of the list of the vulnerable ICC paths;

outputting, by an output component of the mobile device, output data requesting confirmation that the potential unsecure intent is authorized;

receiving, by an input component of the mobile device, user input confirming or denying authorization of the potential unsecure intent; and blocking, by the mobile processor, the potential unsecure intent when the user input denies the authorization of the potential unsecure intent wherein the user input includes a selection of one of a single time authorization of the potential unsecure intent, a single time denial of the authorization, a permanent authorization of the potential unsecure intent, or a permanent denial of the authorization.

11. The method of claim 10 further comprising:

storing, in the memory of the mobile device, a choice database including previous potential unsecure intents and whether each of the previous potential unsecure intents corresponds to the permanent authorization of the potential unsecure intent or the permanent denial of the authorization;

determining, by the mobile processor, that a new intent matches an entry in the choice database; and blocking, by the mobile processor, the new intent when the entry corresponds to the permanent denial of the authorization.

12. The method of claim 11 further comprising allowing, by the mobile processor, the output component to output the output data when the entry corresponds to the permanent authorization of the potential unsecure intent.

13. The method of claim 10 wherein identifying the vulnerable ICC paths includes identifying a path that is vulnerable to at least one of intent spoofing, unauthorized intent receipt, or privilege escalation.

14. The method of claim 10 further comprising:

identifying, by the remote processor or by the mobile device, that a new application has been installed on the mobile operating system;

identifying, by the remote processor or by the mobile device, additional vulnerable ICC paths between new components of the new application and the components of the two or more applications; and storing, in the memory of the remote computing device or in the memory of the mobile device, the additional vulnerable ICC paths.

15. The method of claim 10 wherein a vulnerable ICC path is defined as a path between a component of one of the two or more applications and a sensitive method.

16. The method of claim 10 wherein the mobile operating system includes a module that manages routing of intents among components of the two or more applications.

17. The method of claim 16 wherein identifying the vulnerable ICC paths by analyzing the files includes analyzing files packaged according to mobile app container formats.

* * * * *